United States Patent
Taylor et al.

(10) Patent No.: US 9,001,422 B2
(45) Date of Patent: Apr. 7, 2015

(54) SLIDE HANDLING SYSTEM AND TECHNIQUES

(71) Applicant: Ventana Medical Systems, Inc., Tucson, AZ (US)

(72) Inventors: Michael T. Taylor, Boulder Creek, CA (US); Gregory C. Loney, Los Altos, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 220 days.

(21) Appl. No.: 13/780,287

(22) Filed: Feb. 28, 2013

(65) Prior Publication Data

US 2014/0240824 A1    Aug. 28, 2014

(51) Int. Cl.
G02B 21/34    (2006.01)

(52) U.S. Cl.
CPC ..................... *G02B 21/34* (2013.01)

(58) Field of Classification Search
CPC ................................. G02B 21/34; B25J 18/00
USPC ................. 359/391–398; 414/744.3
See application file for complete search history.

(56) References Cited

U.S. PATENT DOCUMENTS

| | | | |
|---|---|---|---|
| 4,923,294 A * | 5/1990 | Courtenay | 359/393 |
| 5,075,079 A | 12/1991 | Kerr et al. | |
| 5,467,153 A | 11/1995 | Fargeot | |
| 5,781,337 A * | 7/1998 | Pfeifer | 359/391 |
| 6,711,283 B1 | 3/2004 | Soenksen | |
| 6,722,395 B2 * | 4/2004 | Overbeck et al. | 141/1 |
| 2003/0103262 A1 * | 6/2003 | Descour et al. | 359/368 |
| 2005/0282292 A1 | 12/2005 | Torre-Bueno | |
| 2007/0069106 A1 | 3/2007 | Krief et al. | |
| 2008/0240613 A1 | 10/2008 | Dietz et al. | |
| 2009/0135477 A1 * | 5/2009 | Noda | 359/391 |
| 2009/0233331 A1 | 9/2009 | Ostgaard et al. | |
| 2012/0002276 A1 * | 1/2012 | Suzuki et al. | 359/391 |
| 2012/0312957 A1 | 12/2012 | Loney et al. | |

* cited by examiner

*Primary Examiner* — Frank Font
(74) *Attorney, Agent, or Firm* — Muirhead and Saturnelli, LLC

(57) ABSTRACT

In an automated process of handling slides, such as in an imaging system, a slide hander must be able to get a hold of, lift up, and move slides, with tissues samples thereon, to multiple locations quickly and efficiently. To perform this function, the arm of the slide handler needs to be free to move from one location to the next and to advantageously respond in the event of encountering any unexpected or misplaced objects and/or other obstacles without jamming, being damaged and/or causing damage to a slide. A system described herein provides for the use of a slide handler having a crash head assembly with a spring-loaded flexible joint that may disengage if an unexpected obstacle is encountered and spring back to its proper location once the obstacle is cleared. Additionally, because the crash head assembly can flex, it is less likely to break or chip the glass slides.

20 Claims, 24 Drawing Sheets

SLIDE HANDLING SYSTEM AND TECHNIQUES

TECHNICAL FIELD

This application relates to the field of imaging systems, and, more particularly, to systems and techniques for handling slides within an imaging system.

BACKGROUND OF THE INVENTION

Molecular imaging identification of changes in the cellular structures indicative of disease remains a key to the better understanding in medicinal science. Microscopy applications are applicable to microbiology (e.g., gram staining, etc.), plant tissue culture, animal cell culture (e.g. phase contrast microscopy, etc.), molecular biology, immunology (e.g., ELISA, etc.), cell biology (e.g., immunofluorescence, chromosome analysis, etc.), confocal microscopy, time-lapse and live cell imaging, series and three-dimensional imaging.

There have been advances in confocal microscopy that have unraveled many of the secrets occurring within the cell and the transcriptional and translational level changes can be detected using fluorescence markers. The advantage of the confocal approach results from the capability to image individual optical sections at high resolution in sequence through the specimen. However, there remains a need for improved systems and methods for digital processing of images of pathological tissue that provide accurate analysis of pathological tissues with increased efficiency and speed.

It is a desirable goal in digital pathology to obtain high resolution digital images of samples on slides for viewing in a short period of time. Manual methods whereby the pathologist views a slide through the ocular lens of a microscope allows a diagnosis upon inspection of cell characteristics or count of stained cells vs. unstained cells. Automated methods are desirable whereby digital images are collected, viewed on high resolution monitors and may be shared and archived for later use. It is advantageous that the imaging process be accomplished efficiently at a high throughput and minimal damage to the handling system and slides during slide handling within the imaging system.

Accordingly, it would be desirable to provide a system that efficiently provides focused, high quality images at a high throughput while minimizing the potential for delays and damage during slide handling within the imaging system.

SUMMARY OF THE INVENTION

According to a system described herein, a slide handling device is provided including a crash arm assembly. The crash arm assembly includes a first mating part, a second mating part, and an extension arm used in connection with picking up a slide and being coupled to the second mating part. A spring couples the first mating part and the second mating part. The spring is biased by at least one angle in at least one direction. The at least one angle facilitates mating of the first mating part and the second mating part in a normal operating position of the crash arm assembly. Upon deflection of the crash arm assembly from the normal operating position, the spring applies a force to return the crash arm assembly to the normal operating position. The spring may be biased by the at least one angle in a direction out of a horizontal plane of the normal operating position of the crash arm assembly. The at least one angle may be greater than 0 degrees and less than or equal to 10 degrees from the horizontal plane of the normal operating position. The spring may be biased by at least two angles in at least two directions. A first angle of the at least two angles biases the spring in a direction out of a horizontal plane of the normal operating position of the crash arm assembly, and a second angle of the at least two angles biases the spring in a direction within the horizontal plane of the normal operation position of the crash arm assembly. The first angle and the second angle may each be greater than 0 degrees and less than or equal to 10 degrees from the plane of the normal operating position in the two directions. The first mating part may include a first mating surface, and the second mating part includes a second mating surface. Geometries of the first mating surface and the second mating surface may facilitate mating of the first mating part and the second mating part. As a result of a position of the spring, a first force of the spring to return the crash arm assembly to the normal operating position following a deflection in a first direction is different from a second force of the spring to return the crash arm assembly to the normal operating position following a deflection in a second direction. As a result of a position of the spring, a maximum first force applied to the crash arm assembly, before deflection of the crash arm assembly occurs, in a first direction used to pick up a slide is greater than a maximum second force applied to the crash assembly, before deflection of the crash arm assembly occurs, in a second direction different from the first direction. The slide handling system may further include a pickup head assembly coupled to the extension arm that picks up a slide and at least one sensor that detects the deflection of the extension arm.

According further to a system described herein, an imaging system is provided including an imaging device for imaging a sample on at least one slide, a slide rack that stores the at least one slide, and a slide handling device that moves the at least one slide from the slide rack to the imaging device. The slide handling device includes a crash arm assembly. The crash arm assembly includes a first mating part, a second mating part, and an extension arm used in connection with picking up a slide and being coupled to the second mating part. A spring couples the first mating part and the second mating part. The spring is biased by at least one angle in at least one direction. The at least one angle facilitates mating of the first mating part and the second mating part in a normal operating position of the crash arm assembly. Upon deflection of the crash arm assembly from the normal operating position, the spring applies a force to return the crash arm assembly to the normal operating position. The spring may be biased by the at least one angle in a direction out of a horizontal plane of the normal operating position of the crash arm assembly. The at least one angle may be greater than 0 degrees and less than or equal to 10 degrees from the horizontal plane of the normal operating position. The spring may be biased by at least two angles in two directions. A first angle of the at least two angles biases the spring in a direction out of a horizontal plane of the normal operating position of the crash arm assembly, and a second angle of the at least two angles biases the spring in a direction within the horizontal plane of the normal operation position of the crash arm assembly. The first angle and the second angle may each be greater than 0 degrees and less than or equal to 10 degrees from the horizontal plane of the normal operating position in the two orthogonal directions. The first mating part may include a first mating surface, and the second mating part includes a second mating surface. Geometries of the first mating surface and the second mating surface may facilitate mating of the first mating part and the second mating part. As a result of a position of the spring, a first force of the spring to return the crash arm assembly to the normal operating position following a deflection in a first direction is different from a second force of the spring to return the crash arm assembly to the normal operating position following a deflection in a second direction. As a result of a position of the spring, a maximum first force applied to the crash arm assembly, before deflection of the crash arm assembly occurs, in a first direction used to pick up a slide is greater than a maximum second force applied to the crash assembly, before deflection of the crash arm assembly occurs, in a second direction different from the first direction. The slide handling system may further include a pickup head assembly coupled to the extension arm that picks up a slide and at least one sensor that detects the deflection of the extension arm.

BRIEF DESCRIPTION OF THE DRAWINGS

Embodiments of a system described herein will be explained in more detail herein based on the figures of the drawings, which are briefly described as follows.

DETAILED DESCRIPTION OF VARIOUS EMBODIMENTS

Figure 1:
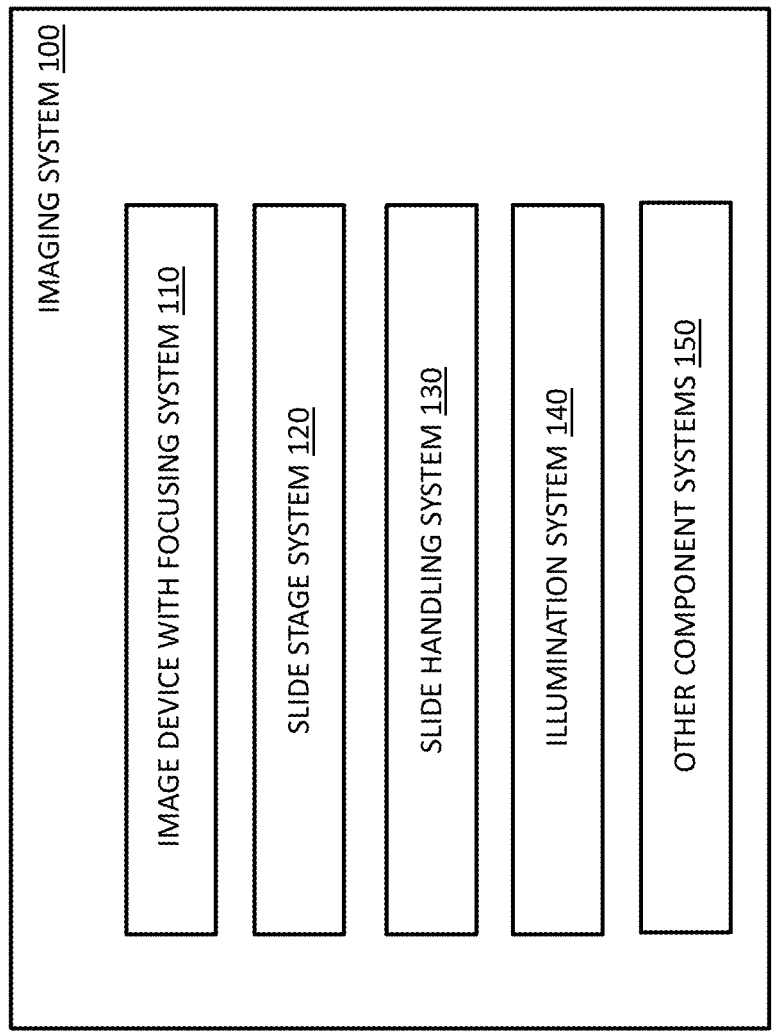
FIG. 1 is a schematic illustration of an imaging system of a scanning microscope and/or other scanning device that may include various component devices used in connection with digital pathology sample scanning, slide handling and imaging according to various embodiments of a system described herein.

FIG. 1 is a schematic illustration of an imaging system 100 of a scanning microscope and/or other scanning device that may include various component devices used with digital pathology sample scanning and imaging and which may be used in with various embodiments of a system described herein. The imaging system 100 may include an imaging device with a focusing system 110, a slide stage system 120, a slide handling system 130 and an illumination system 140, among other appropriate component systems 150 in connection with moving, imaging and storing slides. Various embodiments for components of an imaging system, that may be used in connection with the imaging system 100, are described in U.S. Patent App. Pub. No. 2012/0312957 A1 to Loney et al., entitled "Imaging System and Techniques," which is incorporated herein by reference.

It is also noted that the system described herein may be used in connection with microscope slide scanning instrument architectures and techniques for image capture, stitching and magnification as described in U.S. Patent App. Pub. No. 2008/0240612 A1 to Dietz et al., entitled "Digital Microscope Slide Scanning System and Methods," which is incorporated herein by reference, including features in connection with reconstituting an image with a magnification without substantial loss of accuracy and displaying or storing the reconstituted image.

Figure 2:
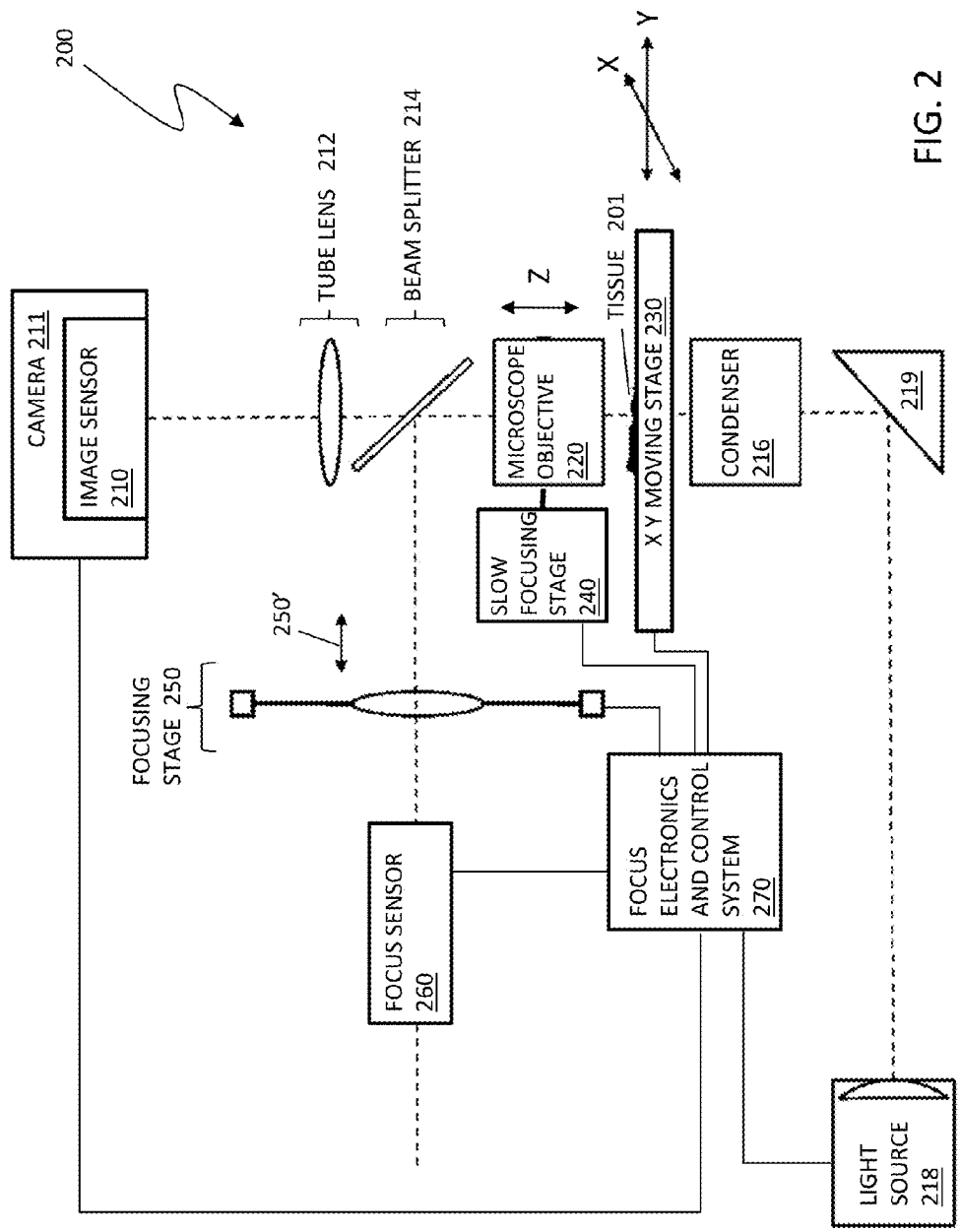
FIG. 2 is a schematic illustration showing an imaging system for handling slides and taking images of a sample on a slide according to an embodiment of a system described herein.

FIG. 2 is a schematic illustration showing an imaging device 200 of an optical scanning microscope and/or other appropriate imaging system that includes components of a focusing system for taking focused images of a tissue sample 201 and/or other object disposed on a slide according to an embodiment of a system described herein. In an embodiment, the focusing system described herein may provide for determining best focus for each snapshot as a snapshot is captured, which may be referred to as "on-the-fly focusing." The devices and techniques provided herein lead to significant reductions in the time required for forming a digital image of an area in a pathology slide. A system described herein provides for creating a digital image of a specimen on a microscope slide using on-the-fly processing for capturing snapshots in which the total time for capturing all the snapshots is less than the time required by a method using a step of pre-determining focus points for each snapshot prior to capturing the snapshots.

The imaging device 200 may include an imaging sensor 210, such as a charge-coupled device (CCD) and/or complimentary metal-oxide semiconductor (CMOS) image sensor, that may be part of a camera 211 that captures digital pathology images. The imaging sensor 210 may receive transmitted light from a microscope objective 220 transmitted via a tube lens 212, a beam splitter 214 and including other components of a transmitted light microscope such as a condenser 216 and a light source 218 and/or other appropriate optical components 219. The microscope objective 220 may be infinity-corrected. In one embodiment, the beam splitter 214 may provide for apportioning approximately 70% of the light beam source directed to the image sensor 210 and the remaining portion of approximately 30% directed along a path to a focusing stage 250 and a focus sensor 260. The tissue sample 201 being imaged may be disposed on an XY moving stage 230 that may be moved in X and Y directions and which may be controlled as further discussed elsewhere herein. A slow focusing stage 240 may control movement of the microscope objective 220 in the Z direction to focus an image of the tissue 201 that is captured by the image sensor 210. The slow focusing stage 240 may include a motor and/or other suitable device for moving the microscope objective 220. The focusing stage 250 and the focus sensor 260 may be used to provide fine focusing control according to a system described herein. In various embodiments, the focusing state 250 may provide for on-the-fly focusing and may be a dither focusing stage, and the focus sensor 260 may be a CCD and/or CMOS sensor.

The focusing stage 250 and the focus sensor 260 may provide focusing, particularly on-the-fly focusing, according to sharpness values and/or other metrics that are rapidly calculated during the imaging process to obtain a best focus for each image snapshot as it is captured. For the focusing stage 250 being a dither focusing stage, the focusing stage 250 may be moved at a frequency, e.g., in a sinusoidal motion (dither motion), that is independent of and exceeds the movement frequency practicable for the slower motion of the microscope objective 220. Multiple measurements are taken by the focus sensor 260 of focus information for views of the tissue over the range of motion of the focusing stage 250. The focus electronics and control system 270 may include electronics for controlling the focus sensor and focus stage 250, a master clock, electronics for controlling the slow focus stage 240 (Z direction), X-Y moving stage 230, and other components of an embodiment of a system in accordance with techniques herein.

The focus electronics and control system 270 may be used to perform sharpness calculations using the information from the focusing stage 250 and focus sensor 260. The sharpness values may be calculated over at least a portion of a sinusoidal curve defined by dither movement. The focus electronics and control system 270 may then use the information to determine the position for the best focus image of the tissue and command the slow focus stage 240 to move the microscope objective 220 to a desired position (along the Z-axis, as shown) for obtaining the best focus image during the imaging process. The control system 270 may also use the information to control the speed of the XY moving stage 220, for example, the speed of movement of the stage 230 in the Y direction. In an embodiment, sharpness values may be computed by differencing contrast values of neighboring pixels, squaring them and summing those values together to form one score. Various algorithms for determining sharpness values may be used. It should be noted that the components used in connection with the focus electronics and control system 270 may also more generally be referred to as electrical components used to perform a variety of different functions in connection with embodiments of the techniques described herein. In an embodiment, the focus electronics and control system 270 may be implemented using a processor that executes software stored on a non-transitory computer readable medium.

According to a system described herein, it is advantageous to reduce and/or otherwise minimize scan times during the handling and scanning of digital pathology slides. A cycle time is the time between each available slide image that is ready for viewing. The cycle time may be influenced by the following steps in acquiring an image: (a) robotically pick up the slide; (b) create a thumbnail view or overview image of the slide tissue area and label; (c) calculate an area of interest bounding the slide tissue; (d) pre-scan the bounded tissue area to find a regular array of best focused points on the tissue; (e) scan the tissue according to movement of a stage and/or sensor; (f) create a compressed output image ready for viewing; and (g) deposit the slide, ready for next slide. It is noted that step (d) may not be necessary if dynamic focusing or "on-the-fly" focusing is performed according to a system described herein, and in which scanning/image acquisition time may, accordingly, be reduced as a result of use of the on-the-fly focusing techniques.

Figure 3:
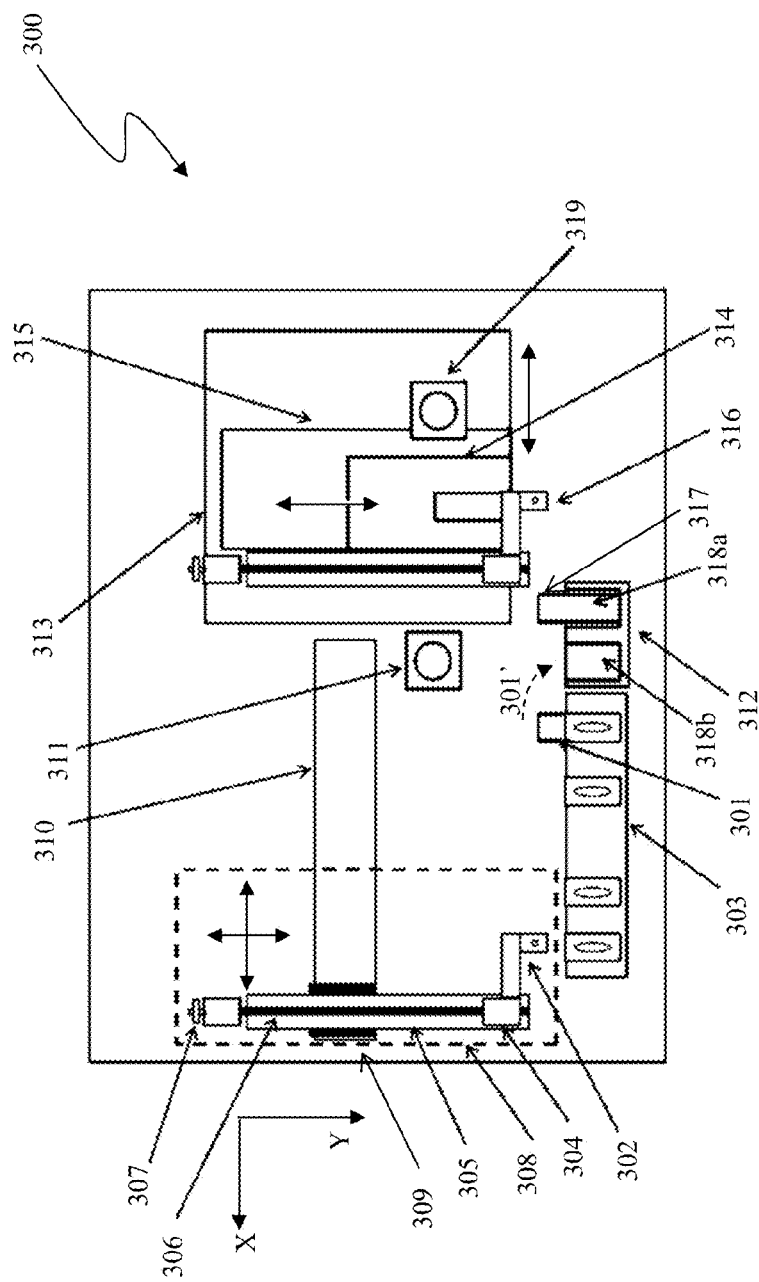
FIG. 3 is a schematic illustration showing a slide handling system according to an embodiment of a system described herein.

FIG. 3 is a schematic illustration showing a slide handling device 300 according to an embodiment of a system described herein. In the illustrated embodiment, the slide handling device 300 is shown in connection with the use of a slide buffer in which slides may be cached in connection with an operational flow of slides in the imaging system. It is noted that other embodiments for slide handling may be suitably used in connection with a system described herein, including embodiments which do not include a buffer and/or embodiments which include multiple slide racks. A slide pickup head 302 may be positioned to pick up a slide 301. As further discussed in detail elsewhere herein, the pickup head 302 according to a system described herein may be explicitly designed to advantageously to pick up the slide 301 in a manner to avoid damage to the slide and to limit the impact of obstacles and/or malfunctions in connection with pickup and movement of a slide within an imaging system.

The slide 301 may be one of a collection of slides in the batch. The collection of slides may be disposed in a slide rack 303. The pickup head 302 is attached to a bearing car or block 304 which travels on a steel rail 305. The bearing block 304 is moved by a rotating lead screw 306. Motor counts may be detected with a rotary encoder 307 and converted into linear travel to control slide position in the Y-direction. The elements 302-307 may comprise a moving assembly referred to as a slide loader/unloader 308. The slide loader/unloader 308 may also move on a motorized bearing car or block 309 in the x direction on rail 310 which allows the slide loader/unloader 308 to move in both the X and Y directions.

In an embodiment, using the pickup head 302, a slide may be positioned under a low-resolution camera 311 to obtain the thumbnail view or overview image of the slide tissue area and label (e.g., the above-noted step (b)). Once this operation is completed, step (c) may be executed and the slide is placed into a position on a slide buffer 312. The slide buffer 312 may include two (or more) buffer slots or positions 318a, 318b, and is shown including a slide 317 in buffer position 318a.

In an embodiment, a compound XY stage 313 may include a stage plate 314 that moves in the Y direction and which is mounted to a plate 315 that moves in the x direction. The stage plate 314 may further include an additional slide pickup head 316. The pickup head 316 may be similar to the pickup head 312 described above. The pickup head 316 may use a mechanical device and/or a vacuum device to pick up a slide.

The pickup head 316 of the compound XY stage 316 may move to the buffer position 318a and pick up the slide 317. The slide 317 may now continue to one or more of the above-noted steps, including steps: (d) prescan, (e) scan and (f) create output image steps. While this processing is being executed, the slide loader/unloader 308 may pick up another slide (e.g., slide 301), obtain the thumbnail view of the slide 301 using the camera 311, and place the slide 301 in an empty position 318b in the slide buffer 312, shown schematically by dotted line 301'. When scanning is completed on the preceding slide (slide 317), the slide pickup head 316 of the XY compound stage 313 may place the slide 317 into the buffer position 318a and pick up the next slide (slide 301) from the buffer position 318b that is ready for scan. The compound XY stage 313 may move in a regular back and forth scan pattern under a high-resolution optical system microscope optics and camera 319 to acquire a high resolution image of biological tissue in accordance with features and techniques discussed elsewhere herein. It is further noted that movements and slide selections of the compound XY stage 313 and/or the slide loader/unloader 308 may be controlled by one or more processors in a control system.

The slide loader/unloader 308 may move to the buffer position 318a and pick up the slide 317 and deposit the slide 317 into the slide rack 303. This slide 317 has completed all of the steps enumerated above. The slide loader/unloader 308 may then continue to pick up and load another slide into the slide buffer 312, and eventually pick up and return the slide 301 to the slide rack 303. Processing like that described above may continue until all slides that are in the slide rack 303 have been scanned.

Figure 4:
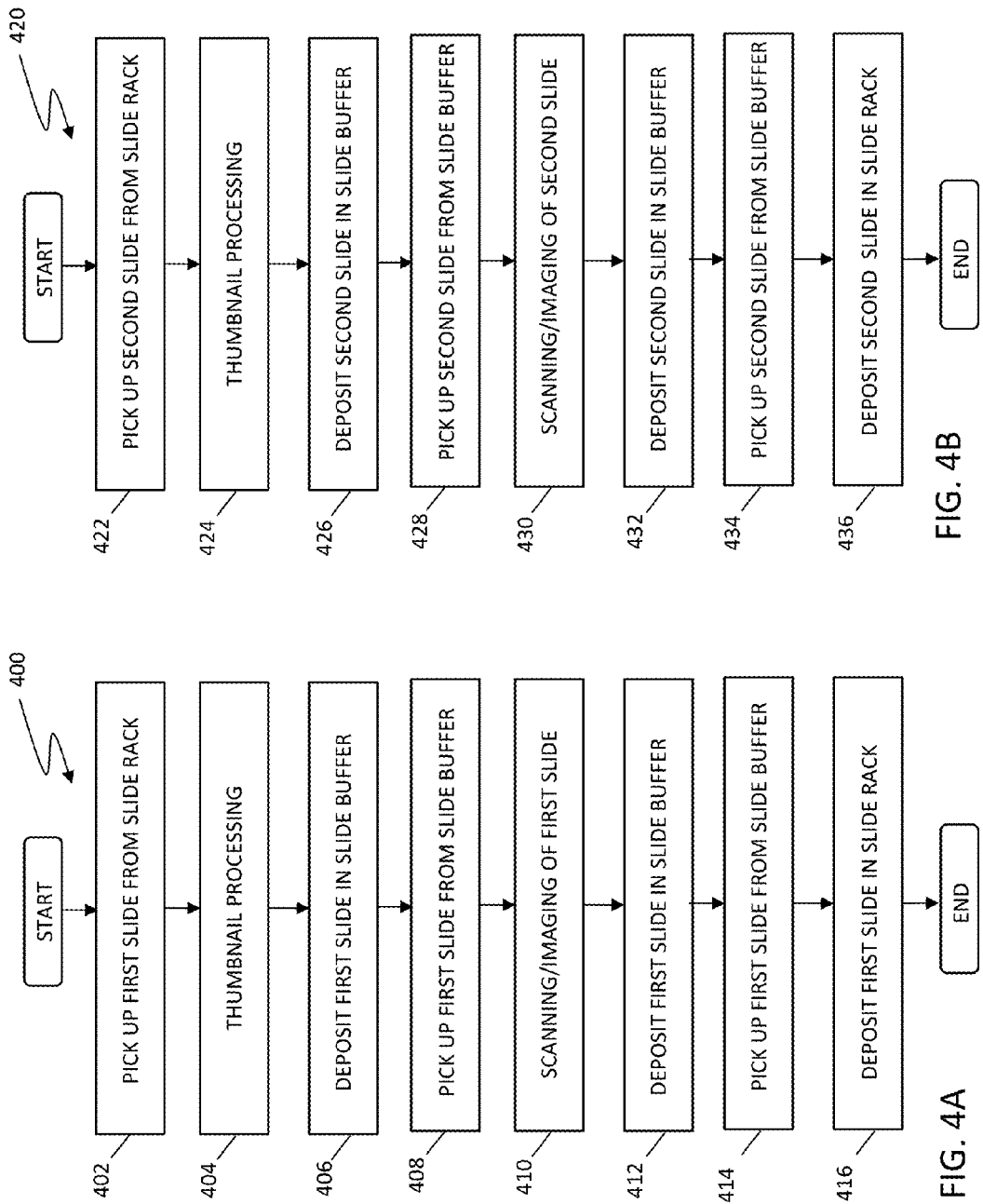
FIGS. 4A and 4B are flow diagrams showing slide handling processing according to an embodiment of a system described herein in connection with first and second slides.

FIG. 4A is a flow diagram 400 showing slide handling processing according to an embodiment of a system described herein in connection with a first slide. At a step 402, the first slide is picked up from a slide rack. After the step 402, processing proceeds to a step 404 where a thumbnail image is obtained and/or other thumbnail processing, that may include determining an area of interest of tissue on the slide, is performed for the first slide. After the step 404, processing proceeds to a step 406 where the first slide is deposited into a slide buffer. After the step 406, processing proceeds to a step 408 where the first slide is picked up from the slide buffer. After the step 408 processing proceeds to a step 410 where the first slide is scanned and imaged according to techniques like that further discussed elsewhere herein. It is noted that in various embodiments the scanning and imaging techniques may include pre-scanning focusing steps and/or using dynamic focusing techniques, such as an on-the-fly focusing technique. After the step 410 processing proceeds to a step 412 where the first slide is deposited in the slide buffer. After the step 412, processing proceeds to a step 414 where first slide is picked up from the slide buffer. After the step 414, processing proceeds to a step 416 where the first slide is deposited in the slide rack. After the step 416, processing is complete with respect to the first slide.

FIG. 4B is a flow diagram 420 showing slide handling processing according to an embodiment of a system described herein in connection with a second slide. As discussed further herein, various steps of the flow diagram 420 may be performed in parallel with steps of the flow diagram 400. At a step 422, the second slide is picked up from a slide rack. After the step 402, processing proceeds to a step 424 where a thumbnail image is obtained and/or other thumbnail processing, that may include determining an area of interest of tissue on the slide, is performed for the second slide. After the step 424, processing proceeds to a step 426 where the second slide is deposited into a slide buffer. After the step 426, processing proceeds to a step 428 where the second slide is picked up from the slide buffer. After the step 428 processing proceeds to a step 430 where the second slide is scanned and imaged according to techniques like that further discussed elsewhere herein. It is noted that in various embodiments the scanning and imaging techniques may include pre-scanning focusing steps and/or using dynamic focusing techniques, such as an on-the-fly focusing technique. After the step 430 processing proceeds to a step 432 where the second slide is deposited in the slide buffer. After the step 432, processing proceeds to a step 434 where second slide is picked up from the slide buffer. After the step 434, processing proceeds to a step 436 where the second slide is deposited in the slide rack. After the step 436, processing is complete with respect to the second slide.

In accordance with an embodiment of a system described herein addressing slide handling, steps of the flow diagram 400 with respect to the first slide may be performed by a slide handling device in parallel with the steps of the flow diagram 420 with respect to the second slide in order to reduce cycle time. For example, the steps 422, 424, 426 of the flow diagram 420 for the second slide (e.g., the steps in connection with picking up the second slide from the slide rack, thumbnail image processing and depositing the second slide into the slide buffer) may overlap with the steps 408, 410, and 412 of the flow diagram 400 with respect to the first slide (e.g., the steps in connection with picking up the first slide from the slide buffer, scanning and imaging the first slide and depositing the first slide back in the slide buffer). Further, the steps 434 and 436 (e.g., steps in connection with picking up the second slide from the slide buffer and depositing the slide into the slide rack) may also overlap with the scanning steps of the first slide. Control of the processing described in the flow diagrams 400 and 420 may be performed using one or more processors executing software stored on computer readable media.

It is noted that in other embodiments, no buffer may be required, and, for example, pickup, thumbnail and deposit times may be reduced using a slide handling device that includes two XY compound stages, for example, which operate independently in connection with two or more slide racks and/or multiple portions of one slide rack.

Figure 5:
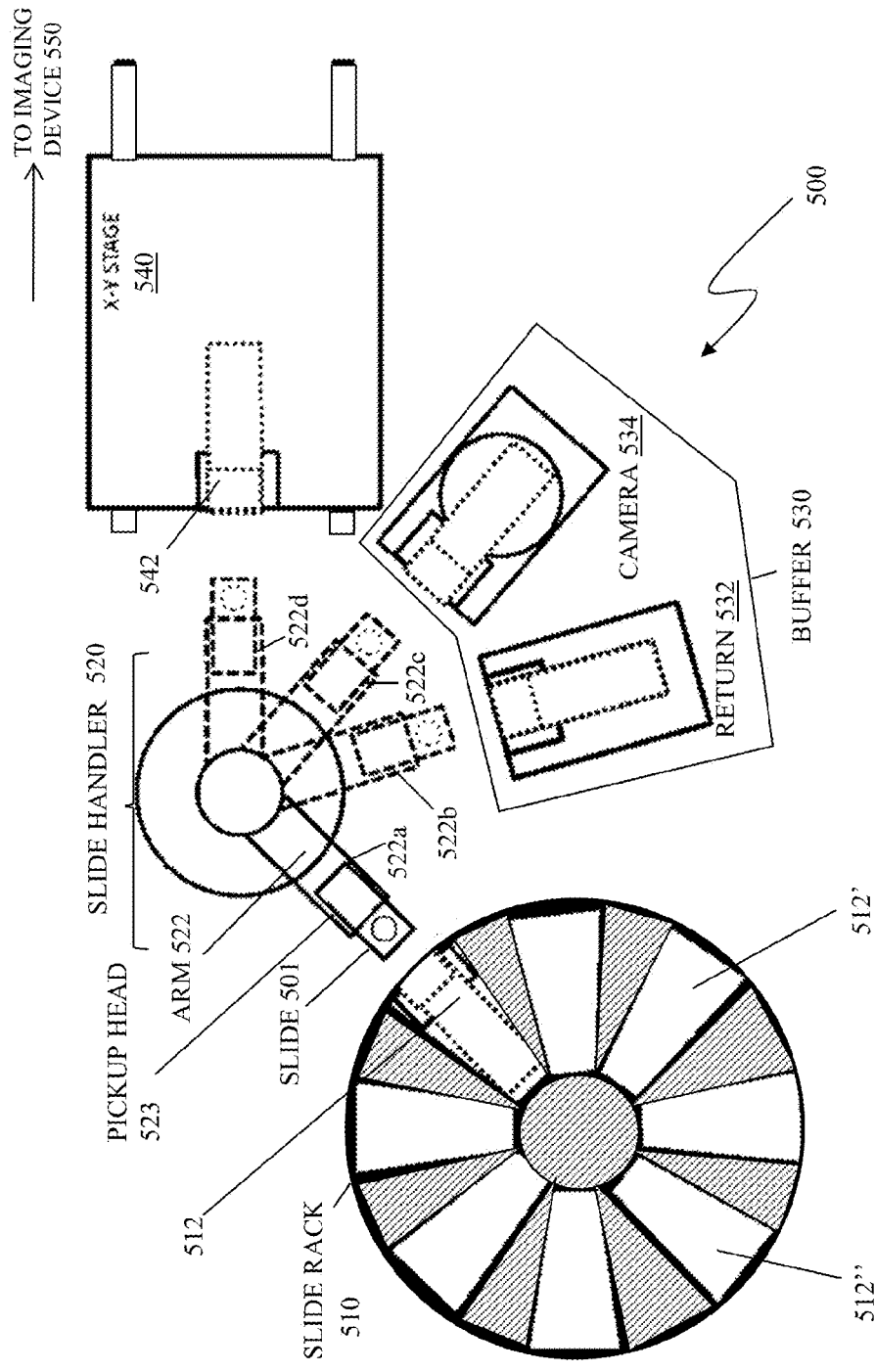
FIGS. 5 and 6 are schematic illustrations showing a slide handling system according to another embodiment of a system described herein.

FIG. 5 is a schematic illustration showing a slide handling system 500 according to another embodiment of a system described herein. The slide handling system 500 may include a slide rack 510, a slide handler 520, a buffer 530 and an XY stage 540. In an embodiment, the slide rack 510 is illustrated as a carousel and the slide rack 510 may include one or more positions 512, 512', 512" in which slides, such as slide 501, may be placed before and/or after being imaged by an imaging device 550 that may have features and functionality like that discussed elsewhere herein. It is noted that the carousel design for the slide rack 510 is shown by way of example only and that other suitable designs and configurations for the slide rack 510 may be used in connection with a system described herein. The positions 512, 512', 512" are shown in an array of wedges (e.g., 8 wedges) and, as further discussed elsewhere herein, the slide rack 510 may have a height such that multiple slide positions extend below each of the top level wedge positions 512, 512', 512" that are shown. The slide handler 520 may include an arm 522 with a pickup head 523 that may include mechanical and/or vacuum devices to pick up a slide. The arm 522 on the slide handler 520 may move between positions 522a-d to move slides among the slide rack 510, the buffer 530 and the XY stage 540. Detailed embodiments for the arm 522 and pickup head 523 are further discussed elsewhere herein, specifically in connection with providing a slide handling system that minimizes damage to slide and the slide handler during slide handling.

The buffer 530 may include multiple buffer positions 532, 534. One buffer position 532 may be designated as a return buffer position 532 in which slides being returned from the imaging device 550 via the XY stage 540 may be positioned before being moved, by the slide handler 520, back to the slide rack 510. Another buffer position 534 may be designated as a camera buffer position 534 in which a slide that is to be sent to the imaging device 550 may first have a thumbnail image captured of the slide according to the techniques discussed elsewhere herein. After a thumbnail image of the slide is captured at the camera buffer position 534, the slide may be moved to a position 542 on the XY stage 540 that transports the slide to the imaging device 550 for scanning and imaging according to the techniques discussed elsewhere herein.

Figure 6:
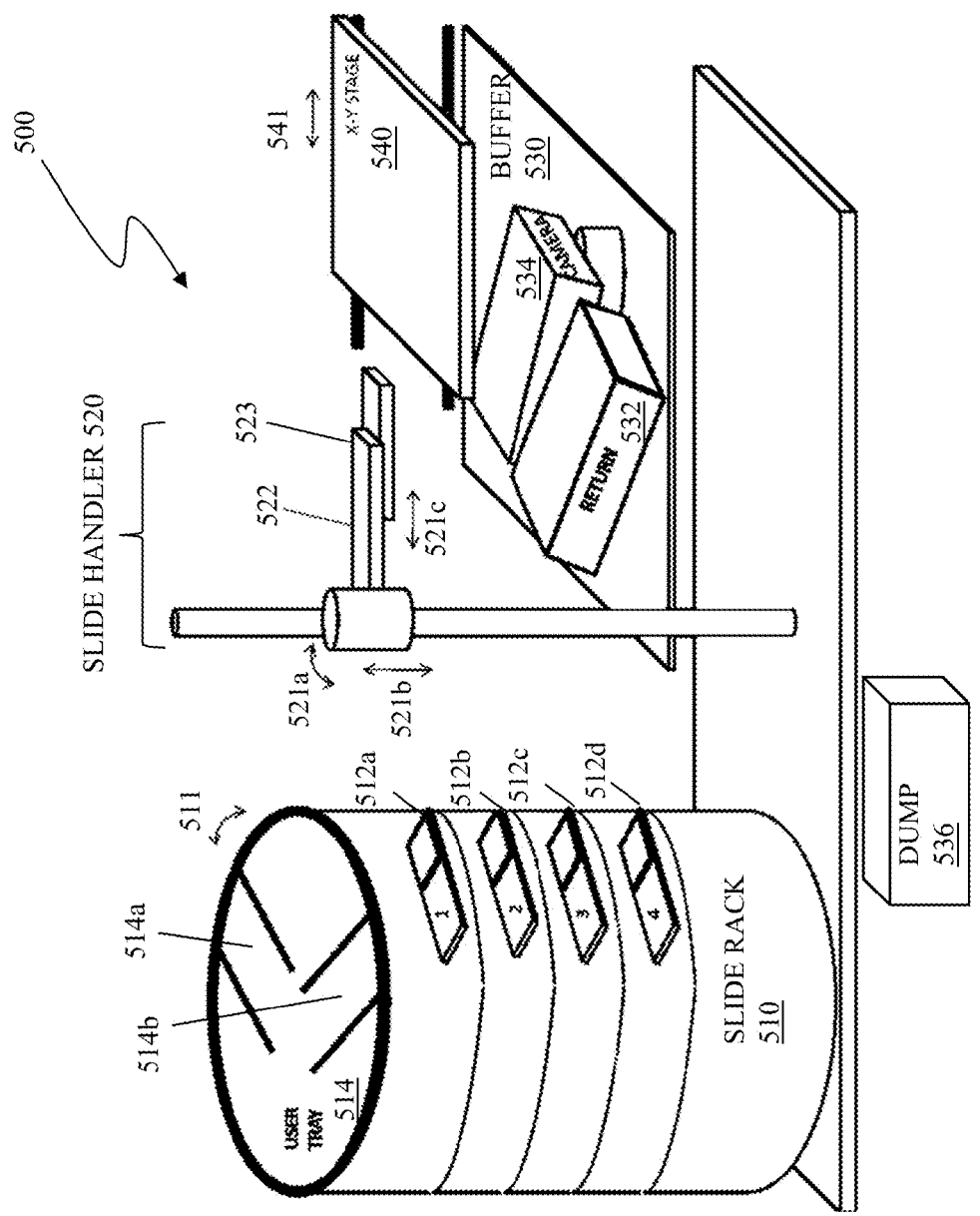

FIG. 6 is a schematic illustration showing another view of the slide handling system 500. The components of the slide handling system 500 may have functionality to operate with various movements and with multiple degrees of freedom of movement. For example, the slide rack 510 may be rotatable in a direction 511 and may include multiple slide positions 512a-d at multiple height positions at each rotational position to accommodate multiple slides (shown as slides 1, 2, 3 and 4). In an embodiment, the multiple slide positions 512a-d in each of the wedge positions 512, 512', 512" may include positions for multiple slides, for example, positioned equidistantly within the height of the slide rack 510. Further, in an embodiment, the slide rack 510 may also include a user tray 514 having one or more slide positions 514a,b at which a user may insert a slide to be imaged in addition to other slides in the slide rack 510. Interaction of a slide into the user tray 514, for example lifting a cover of the user tray 514 and/or inserting the slide into one of the positions 514a,b of the user tray 514, may act to trigger a by-pass mode in which a slide from the user tray 514 is processed instead of the next slide from the wedge positions of the slide rack 510.

The arm 522 of the slide handler 520 is shown having at least three degrees of freedom in motion. For example, the arm 522 may rotate in a direction 521a in order to engage each of the slide rack 510, the buffer 530 and the XY stage 540. Additionally, the arm 522 may move in a direction 521b corresponding to different heights of positions 512a-d of the slide rack 510. Additionally, the arm 522 may extend in direction 521c in connection with loading and unloading slides from the slide rack 510, the buffer 530 and the XY stage 540. In an embodiment, it is advantageous to minimize the arc distance that the arm 522 rotates and/or minimize other distances traversed by the arm 522 and/or slide handler 520 in order to minimize dead times of the slide handling system 500, as further discussed below. Movements of the slide rack 510, slide handler 520, and XY stage 540 may be controlled, in various embodiments, by a control system like that which discussed elsewhere herein. It is also noted that, in an embodiment, the buffer 530 and the XY stage 540 may be at the same height. In another embodiment, the slide handler 520 may, in some cases, move a slide to a dump position 536.

According to an embodiment of a system described herein, and as discussed in detail herein, in an automated process of handling slides, a slide hander must be able to get a hold of, lift up, and move slides, with tissues samples thereon, to multiple locations quickly and efficiently. To perform this function, the arm of the slide handler needs to be free to move from one location to the next and to advantageously respond in the event of encountering any unexpected or misplaced objects and/or other obstacles without jamming, being damaged and/or causing damage to a slide. A system described herein addresses the above-noted issues through the use of a slide handler having a crash head assembly with a spring-loaded flexible joint that may disengage if an unexpected obstacle is encountered and spring back to its proper location once the obstacle is cleared. Additionally, because the crash head assembly can flex, it is less likely to break or chip the glass slides. In various embodiments, a system described herein may be used in connection with slide imaging and/or handling products produced by Ventana Medical Systems, Inc. of Tucson, Ariz., and including, for example, a Ventana iScan HT unit. It is noted that the term "spring" principally used herein should be understood to also refer to any appropriate elastic element that exerts a recovery force opposing an external force that is applied to an initial state of the elastic element.

Figure 7:
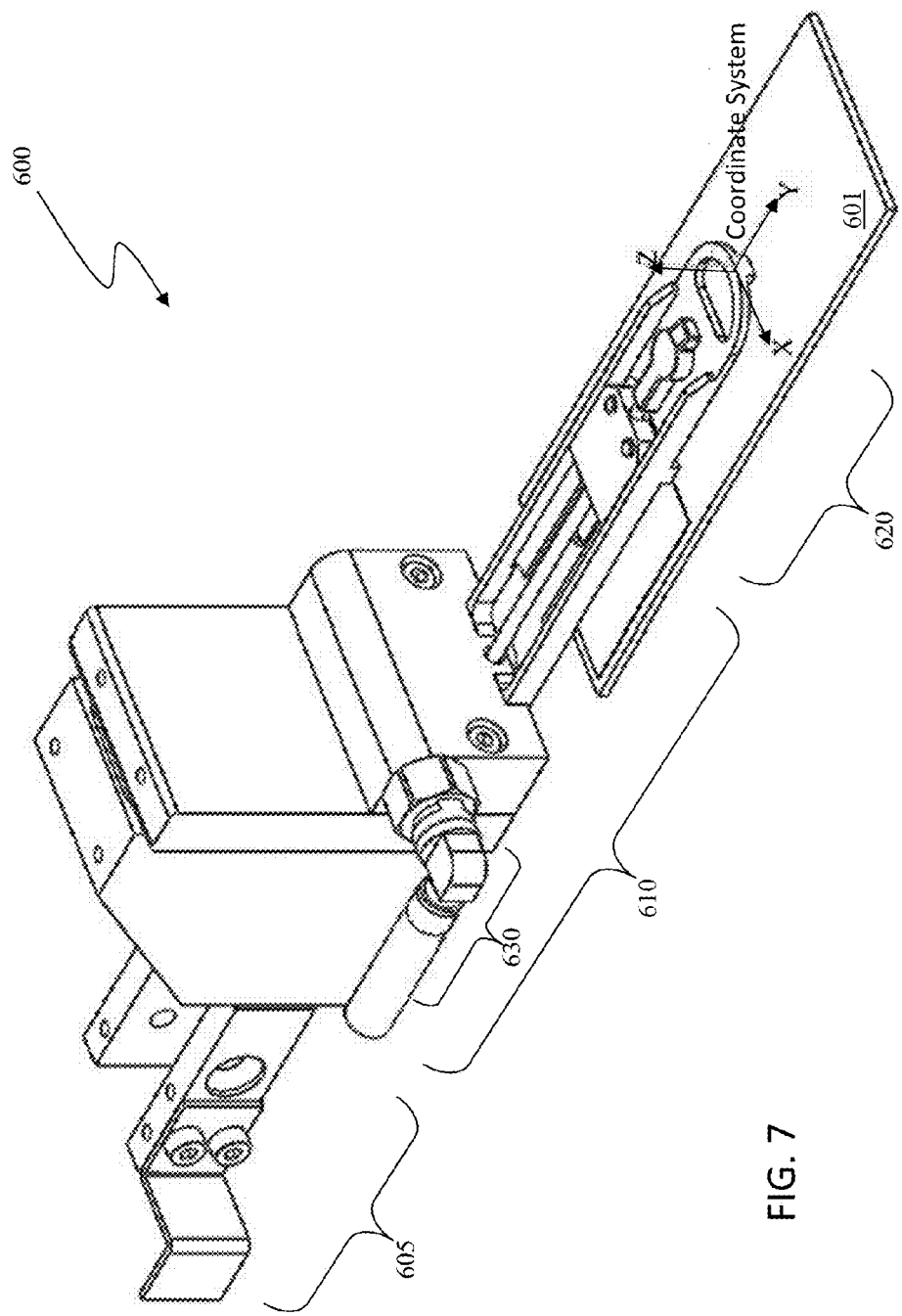
FIG. 7 is a schematic illustration showing an crash head assembly, referred to herein as crash head, holding a microscope slide that may be used in connection with a slide handling system according to an embodiment of a system described herein.

FIG. 7 is a schematic illustration showing a crash head assembly, referred to herein as crash head 600, holding a microscope slide 601 that may be used in connection with a slide handling system according to an embodiment of a system described herein. The crash head 600 may include a crash arm assembly (crash arm 610) and a pickup head assembly (pickup head 620) for picking up the slide 601. In various embodiments, the pickup head 620 may include a mechanical device, such as a suction cup, and/or vacuum device to pick up the slide. An attachment mechanism 605 is shown for attachment of the crash head 600 to a moveable base and/or other movement mechanism of a slide handler (see, e.g., FIGS. 5 and 6). An orthogonal XYZ coordinate system is shown in connection with the orientation of the slide on the crash head 600 in a normal operating position, which coordinate system will be referred in connection with the discussion herein of the function and features of the crash head 600. The crash head 600 may further include one or more component assemblies 630 that may be used to detect when deflection of the crash arm 610 occurs, as further discussed elsewhere herein, and may send appropriate information of such deflections to a controller and/or display for analysis and/or malfunction warnings. In an embodiment, the component assembly 630 may be a sensor assembly that directly detects the deflection. In another embodiment, the component assembly 630 may be a component used in connection with the pickup head 620, such as a component of a vacuum assembly for the pickup head 620, whereupon a change in the component 630, such as a loss of pressure in the event of a collision that deflects the crash head 600 and causes detachment of the slide from the pickup head 620, may generate an error message (e.g. a vacuum error message) that indirectly indicates the deflection.

Figure 8:
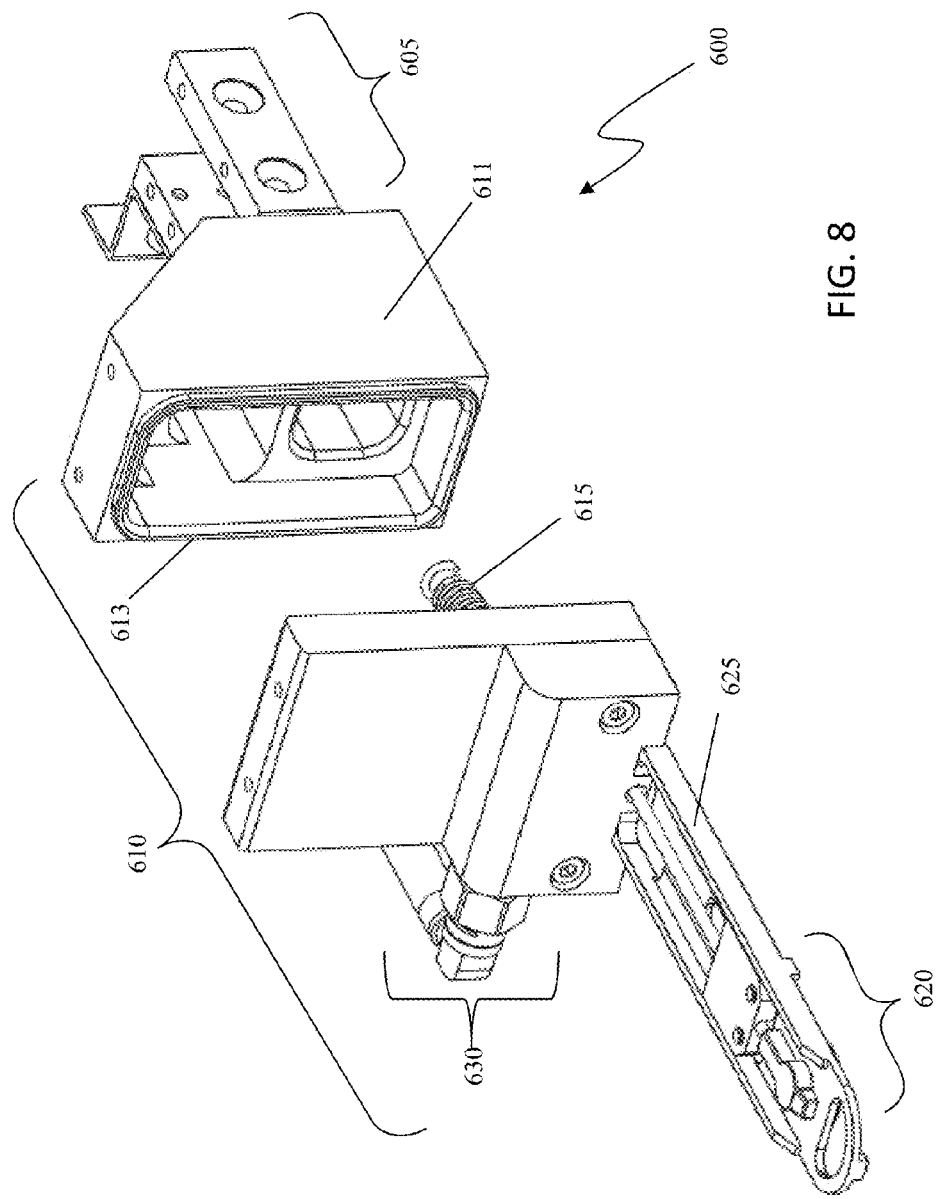
FIGS. 8 and 9 are schematic illustrations showing exploded views of the crash head to illustrate two mating parts of a crash arm according to an embodiment of a system described herein.
Figure 9:
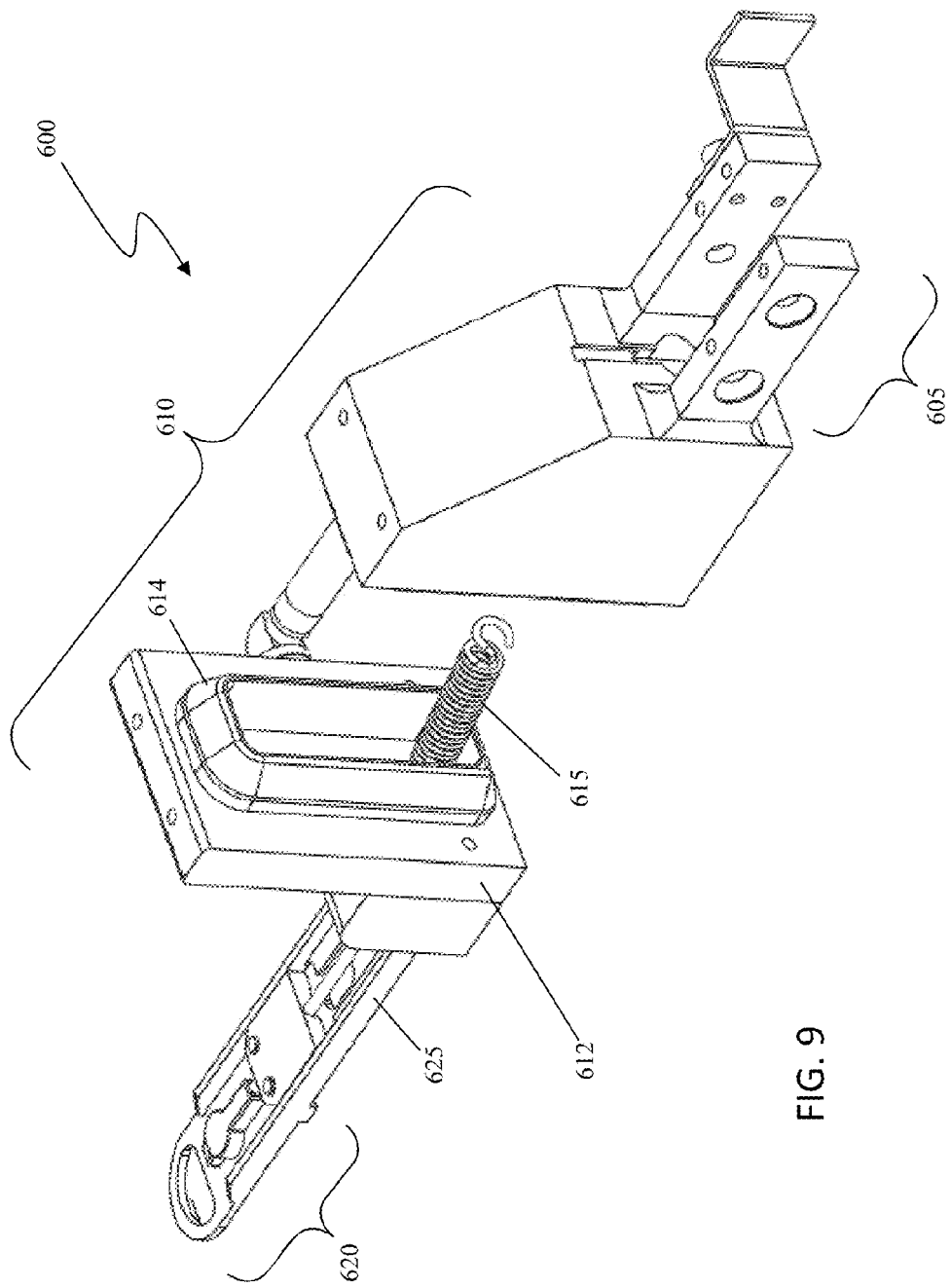

FIGS. 8 and 9 are schematic illustrations showing exploded views of the crash head 600 to illustrate two mating parts 611, 612 of the crash arm 610 according to an embodiment of a system described herein. FIG. 8 shows the crash arm 610 illustrated in exploded view to show a rectangular female pocket 613 of the mating part 611. FIG. 9 shows the crash arm in another exploded view to illustrate a rectangular protrusion 614 of the mating part 612 that engages with the female pocket 613. A spring 615, internal to the crash arm 610, is illustrated having features and positioning to provide advantageous functionality of the crash head 600, as further discussed in detail herein. A extension arm assembly 625 of the crash arm 610 is coupled to the mating part 612 and to which the pickup head 620 may be coupled.

In order for the crash arm 610 to disengage, the extension arm assembly 625 is held in position, via the mating part 612, as a result of the spring 615 which can stretch when needed to allow the crash arm 610 to disengage from the normal operating position and flex during an encounter with an obstacle. Upon reengagement, the spring 615 pulls the crash arm 610 back into the normal operating position. The normal operating position is determined by the mounting of the spring 615 at one or more angles to bias the two mating parts 611, 612 so the crash arm 610 will register into a corner of the mating parts, as further discussed elsewhere herein. In an embodiment, the spring-loaded of the two mating parts 611, 612 causes the mating parts 611, 612 to pull against each other to mate on three orthogonally-machined reference surfaces. The spring 615 is mounted at the one or more angles so that the three orthogonal surfaces on the crash arm 610 are pulled into the corner formed by the three orthogonal surfaces of the mating parts. This may take advantage of a milling machine's ability to operate with precision in three orthogonal planes. Alternately, in other embodiments, the mating parts 611, 612 may be molded, investment casted, and/or fabricated in some other way and still make use of the ability of such fabrication techniques to produce precise surfaces where the mating parts 611, 612 mate. In one or more embodiments, the reference surfaces are not necessarily orthogonal. For example, the draft angles of molded parts may produce surfaces at some angle deviating from pure orthogonality, yet still be orientated such that the two parts 611, 612 mate in a repeatable position.

A function of the crash head 600 is to move the crash arm 610 forward in the Y direction until the pickup head 620 is positioned over the slide 601 (e.g., in a cassette or tray), move down in the Z direction, and pick up the slide 610 using the pickup head 620 (e.g., with vacuum using a suction cup). In picking up the slide 601, there is some variability in the position of the slide 601 relative to the arm 610; the slide 601 may be gripped slightly off center and/or at a slight angle. To correct this misalignment, in an embodiment, the slide handler (see, e.g., FIGS. 5 and 6) may next place the slide down in a return station and push the slide toward a reference or registration point in the XY plane. Hence, the crash arm 610 pushes down on the slide in the Z direction, and pushes the crash arm 610 sideways in the X direction to the registration point. In various embodiments, the registration point for a slide may include use of a registration pin, a registration corner by a design of a slide station or position and/or other appropriate mechanism for positioning the slide at a known location.

The action of the crash arm 610 to position a slide at a registration point and to grab the slide creates a tendency for the crash arm 610 to be pushed toward the positive X & Z directions. Taking advantage of this action, the spring 615 is angled to create one or more forces that also draw the crash arm 610 toward the positive X & Z directions, as well as the negative Y direction. This is useful since, when the crash arm 610 returns to reengagement (after being disengaged), it may be slightly off position, however the action of the crash arm 610 works to push it back fully into the proper operating position.

A system described herein operates using modified kinematic alignment principles. True kinematic alignment would utilize 3 contact points to establish a plane, 2 contact points to establish a perpendicular plane, and 1 contact point to establish a third plane perpendicular to the first two. Instead, a system described herein makes use of three orthogonal planes, rather than contact points. Realistically, under a system described herein, plane-to-plane contact on all three planes does not occur since slight imperfections on the surfaces would lead to high spots making contact and low spots having gaps (although these gaps are quite small). However, the mating parts 611, 612 aided by the action of the crash arm 610 and the bias of the spring 615 yields a repeatable position after a disengagement and reengagement.

The crash arm 610 may move in all directions of the XYZ coordinate system during operation: up, down, left and right. Features of the crash arm 610 described herein enable the crash arm to disengage with relative ease if the crash arm 610 encounters an obstacle. However, when the crash arm 610 is pushing down on a slide, for example when applying pressure to the pickup head (e.g., with a suction cup) to pick up the slide, it is desirable that the crash arm 610 should remain a little firmer before disengaging as compared with release of the crash arm 610 in other directions. In an embodiment, a downward force of 2 lbs. is selected as a proper amount for the pickup application of a slide; hence the arm should not disengage until the downward force reaches approximately 2 lbs. It is noted that although this value enables the crash arm to perform its function of pushing down on slides when gripping with suction without getting to the point where the glass slide might break, under other circumstances (e.g. thicker glass slides) other values for a suitable downward force may be suitably used as a basis for the features and configurations of a system described herein. The crash arm 610 should release more easily in other directions. For these reasons the shape of the interface is rectangular and the location of the spring selected so the disengagement force needed is approximately 2 lbs. when the arm is pushed up, but less force, generally around 0.5 lb. when the arm is pushed in any other direction.

Figure 10:
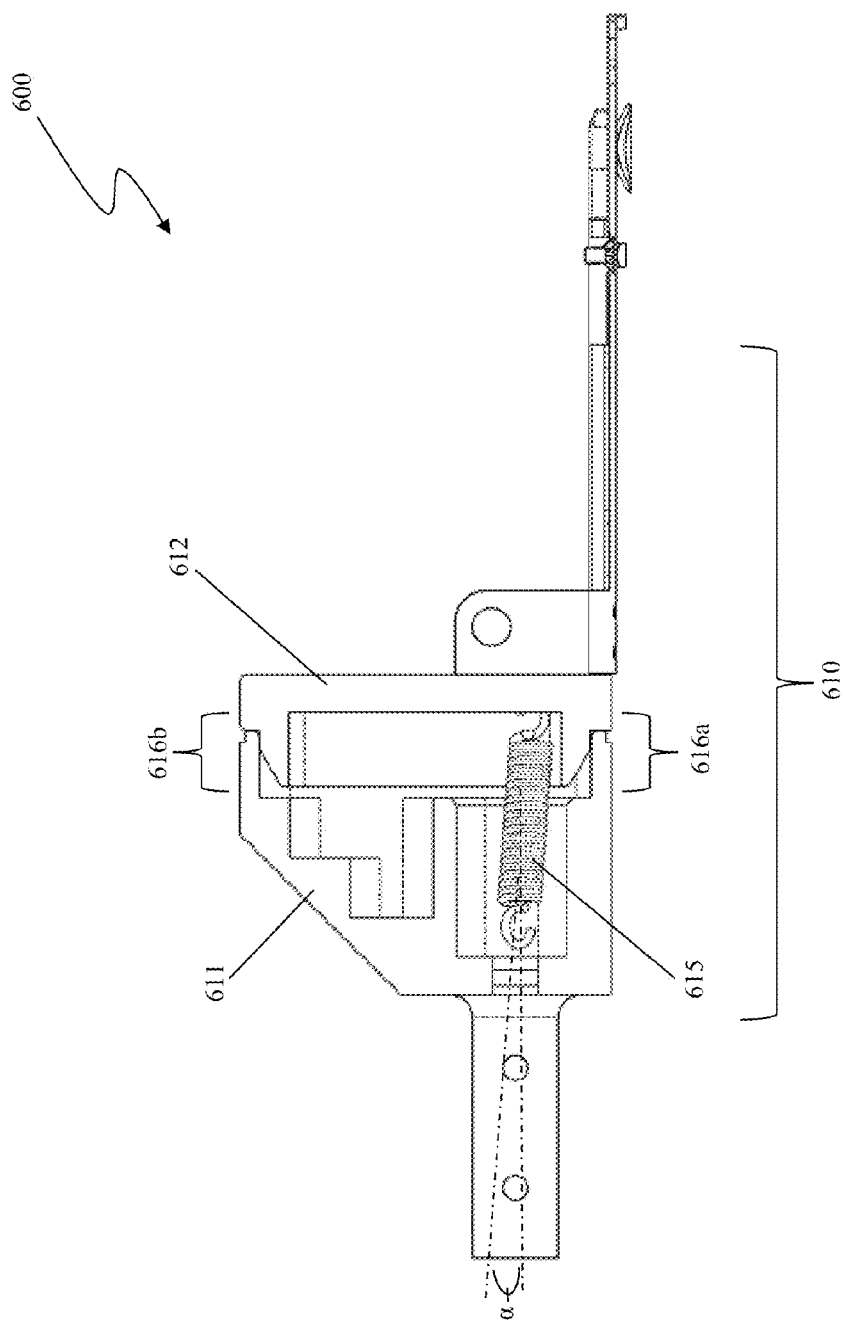
FIG. 10 is a schematic cross-sectional side view illustration of the crash head showing the two mating parts fully engaged with a spring biased at an angle α according to an embodiment of a system described herein.

FIG. 10 is a schematic cross-sectional side view illustration of the crash head 600 showing the two mating parts 611, 612 fully engaged with the spring 615 biased by an angle α according to an embodiment of a system described herein. In an embodiment, the angle α may bias the crash arm 610 to enable a higher downward force (e.g., 2 lbs) than other directional forces (e.g., 0.5 lbs) to enable the crash arm 610 to press against and pick up a slide. The angle α further encourages the two mating parts 611, 612 to mate at a horizontal reference surface. The angle α is non-parallel with a longitudinal axis of the slide 610 when positioned on the crash head 600 in the normal operating position. In an embodiment, the angle α may be approximately 4°, but other appropriate angles, including angles between 0 and 10°, may be also be used in connection with a system described herein. As further discussed elsewhere herein, selection of the angle α may be a result of balancing the increasing amount of force necessary to appropriately re-position the crash head 600 in the normal operating position following increasing large (and increasingly rare) collisions with the benefit of keeping the structure of the crash head 600 small for desired operational purposes and to reduce costs.

Geometries of mating surfaces 616a,b of the mating parts 611, 612 are illustrated. In various embodiments, the inclined surfaces and smooth radii of the mating surfaces 616a,b guide the parts 611, 612 together and allow the parts 611, 612 to more easily mate. The geometries of the mating surfaces 616a,b further facilitate the action of the spring 615 to return the crash arm 610, after being deflected, back into a normal operating position and/or, in some cases, enable a user to manually reposition the crash arm 610 into the normal operating position following an abnormally large deflection. The geometries of the mating surfaces 616a,b, may be determined based on particular operating conditions and criteria, specifically, for example, criteria defining an abnormally large deflection of the crash arm 610. In an embodiment, a deflection above 30° (in any direction) may be considered an abnormally large deflection that may result from a big collision, for example.

Figure 11:
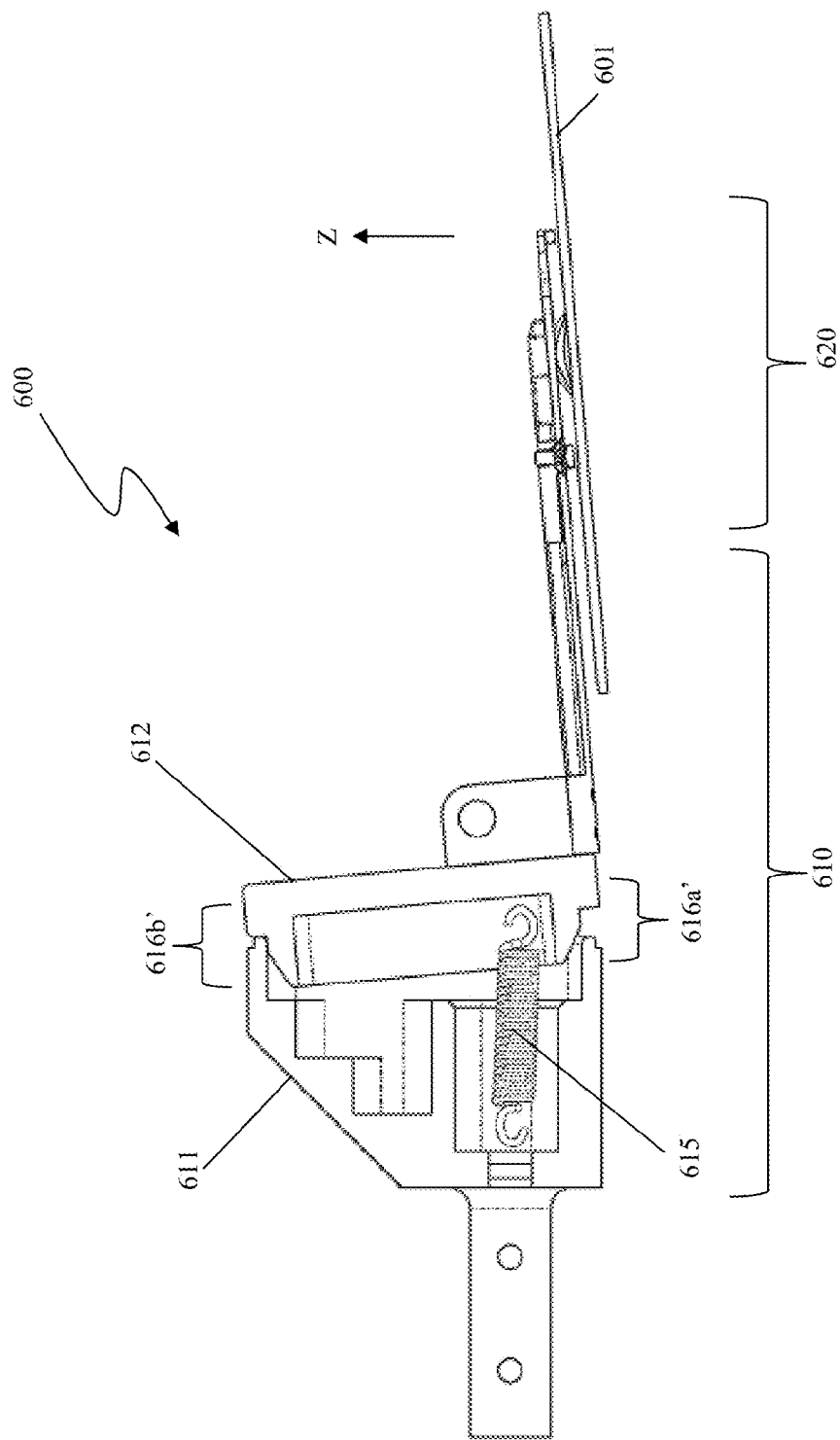
FIG. 11 is a schematic cross-sectional side view illustration of the crash head showing the crash arm after being deflected upwards (Z direction) according to an embodiment of a system described herein.

FIG. 11 is a schematic cross-sectional side view illustration of the crash head 600 showing the crash arm 610 (and pickup head 620) after being deflected upwards (Z direction) according to an embodiment of a system described herein. For example, the crash arm 610 may be deflected upwards in response to hitting an obstacle or in the event of the crash arm 610 pushing with too much downward force to pick up the slide 601. The engagements of the mating surfaces 616a,b are shown in deflected positions 616a',b'. After the obstacle is cleared and/or the crash arm 610 released, the crash arm 610 will seat itself back into a normal operating position by the action of the spring 615 and the engagements of the mating surfaces 616a,b.

Figure 12:
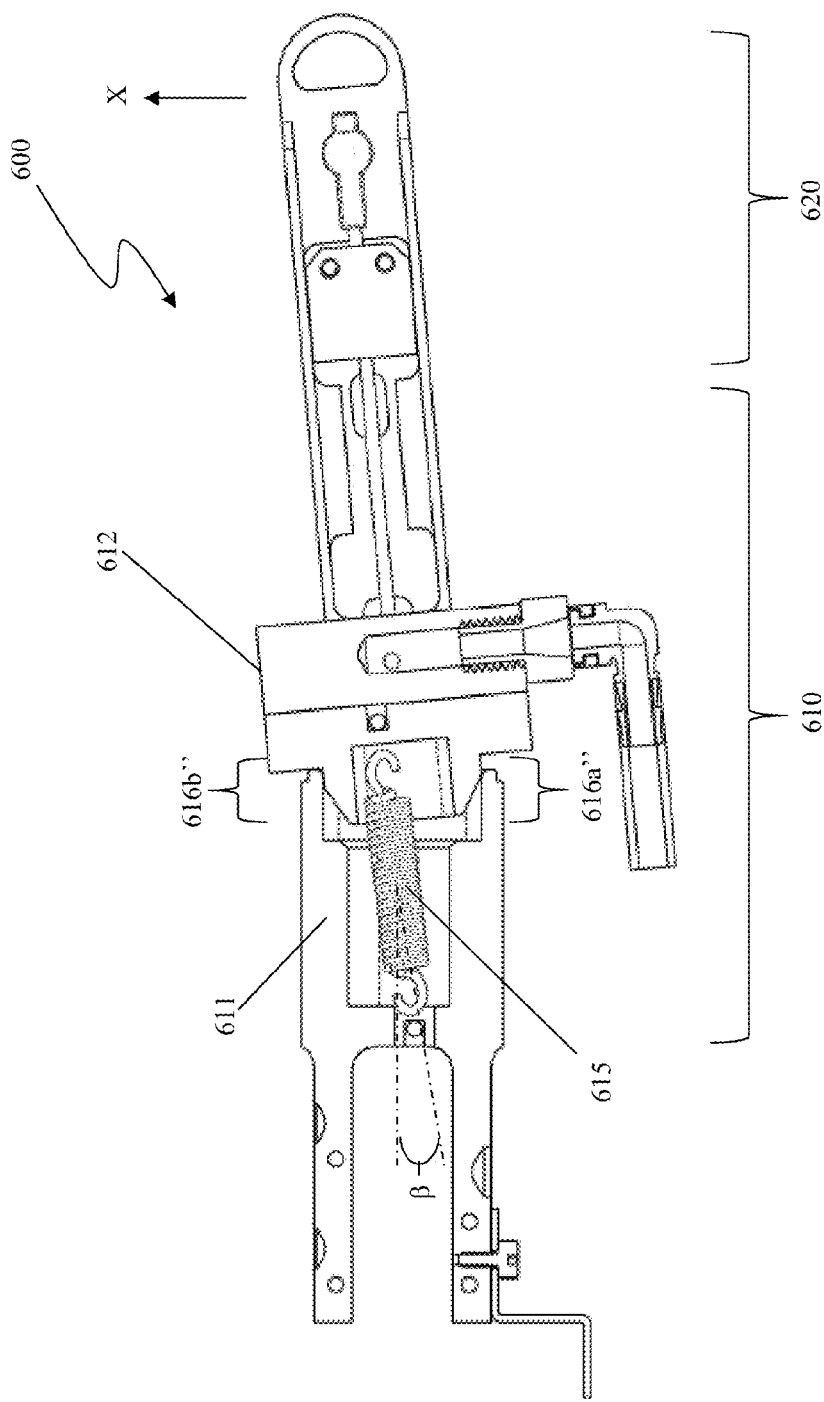
FIG. 12 is a schematic cross-sectional top view illustration of the crash head showing the crash arm deflected sideways (X direction) and in which the spring maybe biased at an angle β according to an embodiment of a system described herein.

FIG. 12 is a schematic cross-sectional top view illustration of the crash head 600 showing the crash arm 610 (and pickup head 620) deflected sideways (X direction) according to an embodiment of a system described herein. For example, the crash arm 610 may be deflected sideways in response to hitting an obstacle. The engagements of the mating surfaces 616a,b are shown in deflected positions 616a'',b''. The spring 615 maybe biased at an angle β to encourage the two mating parts to mate at a vertical reference surface. The angle β is non-parallel with a longitudinal axis of the slide 610 when positioned on the crash head 600 in the normal operating position. In an embodiment, the angle β may be approximately 6°, but other appropriate angles, including angles between 0 and 10°, may be also be used in connection with a system described herein. After the obstacle is cleared and/or the crash arm 610 released, the crash arm 610 will seat itself back into a normal operating position by the action of the spring 615 and the engagements of the mating surfaces 616a, b. As further discussed elsewhere herein, selection of the angle β may be a result of balancing the increasing amount of force necessary to appropriately re-position the crash head 600 in the normal operating position following increasing large (and increasingly rare) collisions with the benefit of keeping the structure of the crash head 600 small for desired operational purposes and to reduce costs.

Figure 13:
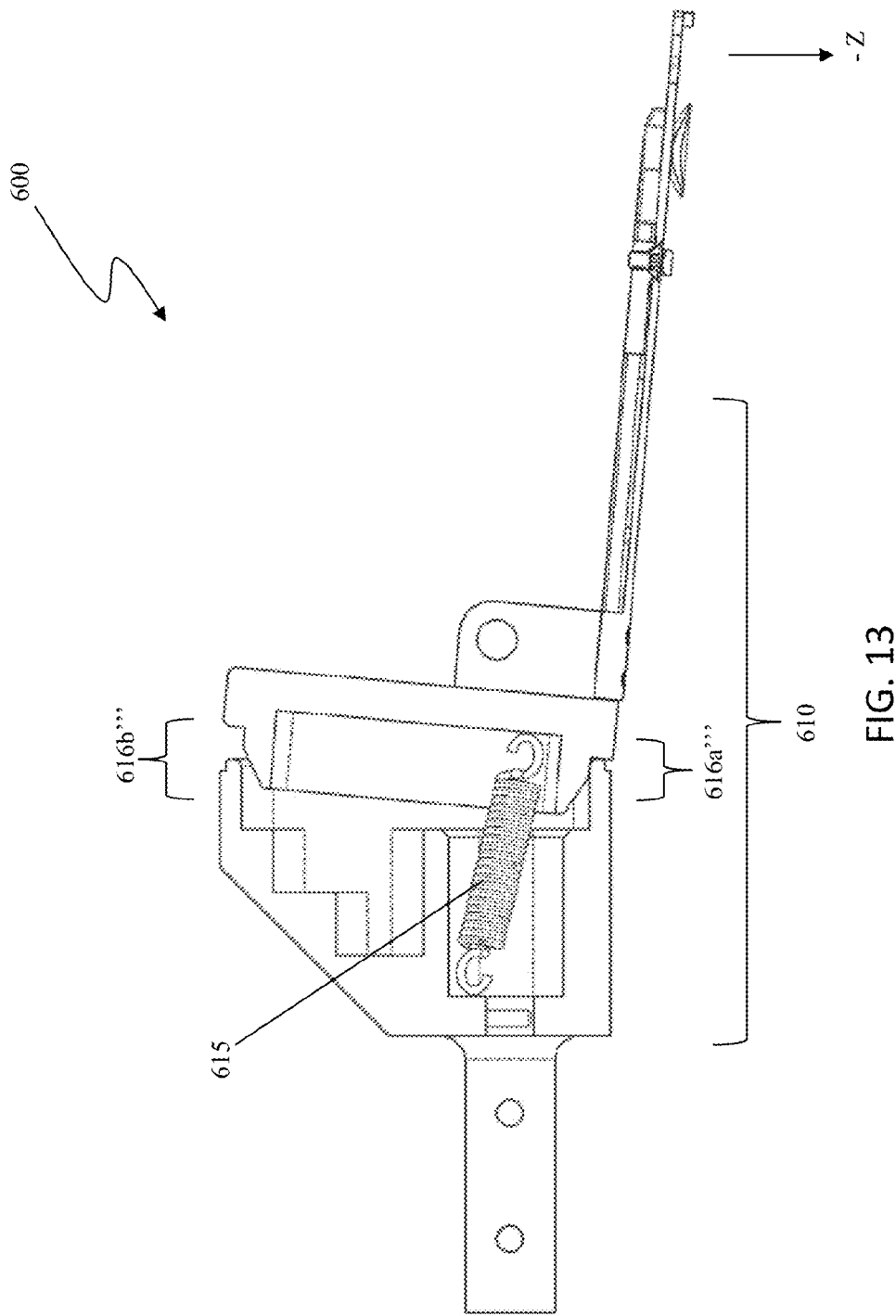
FIG. 13 is a schematic cross-sectional side view illustration of the crash head showing the crash arm deflected downward (−Z direction) according to an embodiment of a system described herein.

FIG. 13 is a schematic cross-sectional side view illustration of the crash head 600 showing the crash arm 600 deflected downward (−Z direction) according to an embodiment of a system described herein. For example, the crash arm 610 may be deflected downwards in response to hitting an obstacle. The engagements of the mating surfaces 616a,b are shown in deflected positions 616a''',b'''. After the obstacle is cleared and/or the crash arm 610 released, the crash arm 610 will seat itself back into the normal operating position by the action of the spring 615 and the engagements of the mating surfaces 616a,b.

Figure 14:
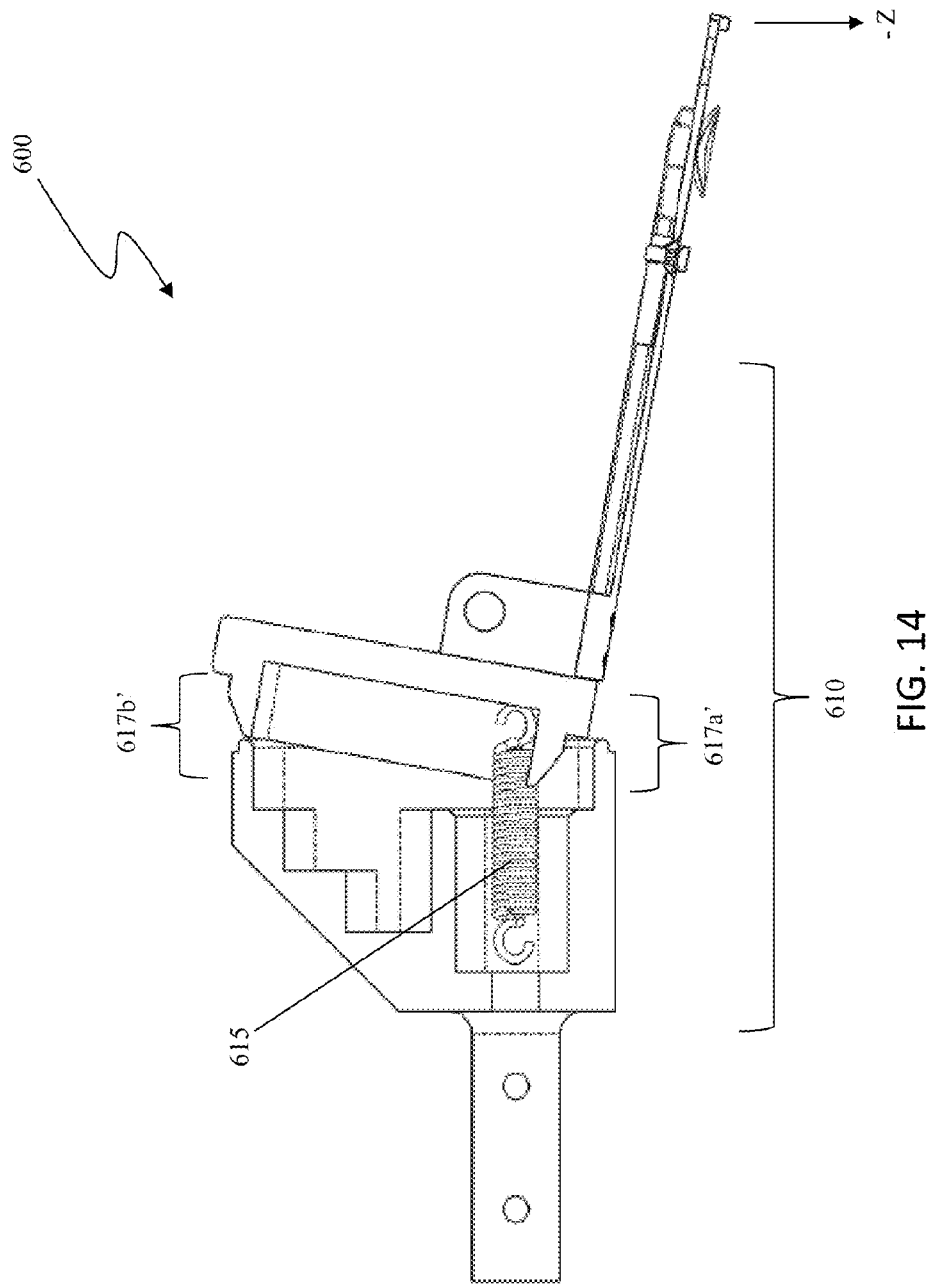
FIG. 14 is a schematic cross-sectional side view illustration of the crash head showing the crash arm with an excessive amount of downward deflection (−Z direction) after a big collision with an obstacle according to an embodiment of a system described herein.

FIG. 14 is a schematic cross-sectional side view illustration of the crash head 600 showing the crash arm 610 with an excessive amount of downward deflection (−Z direction) after a big collision with an obstacle according to an embodiment of a system described herein. Excessive deflected positions 617a',b' of the mating surfaces 616a,b, are illustrated. In this condition, the crash arm 610 may not be able to restore itself, but a system described herein provides that a user may easily to pop the crash arm 610 back into an alignment, in connection with the mating surfaces 616a,b, in which the spring 615 will then again facilitate positioning the crash arm 610 into the normal operating position. Hence, there may be no significant down time waiting for a field service repair even when a big collision has occurred that is not able to be self-corrected according to this embodiment of a system described herein.

Figure 15:
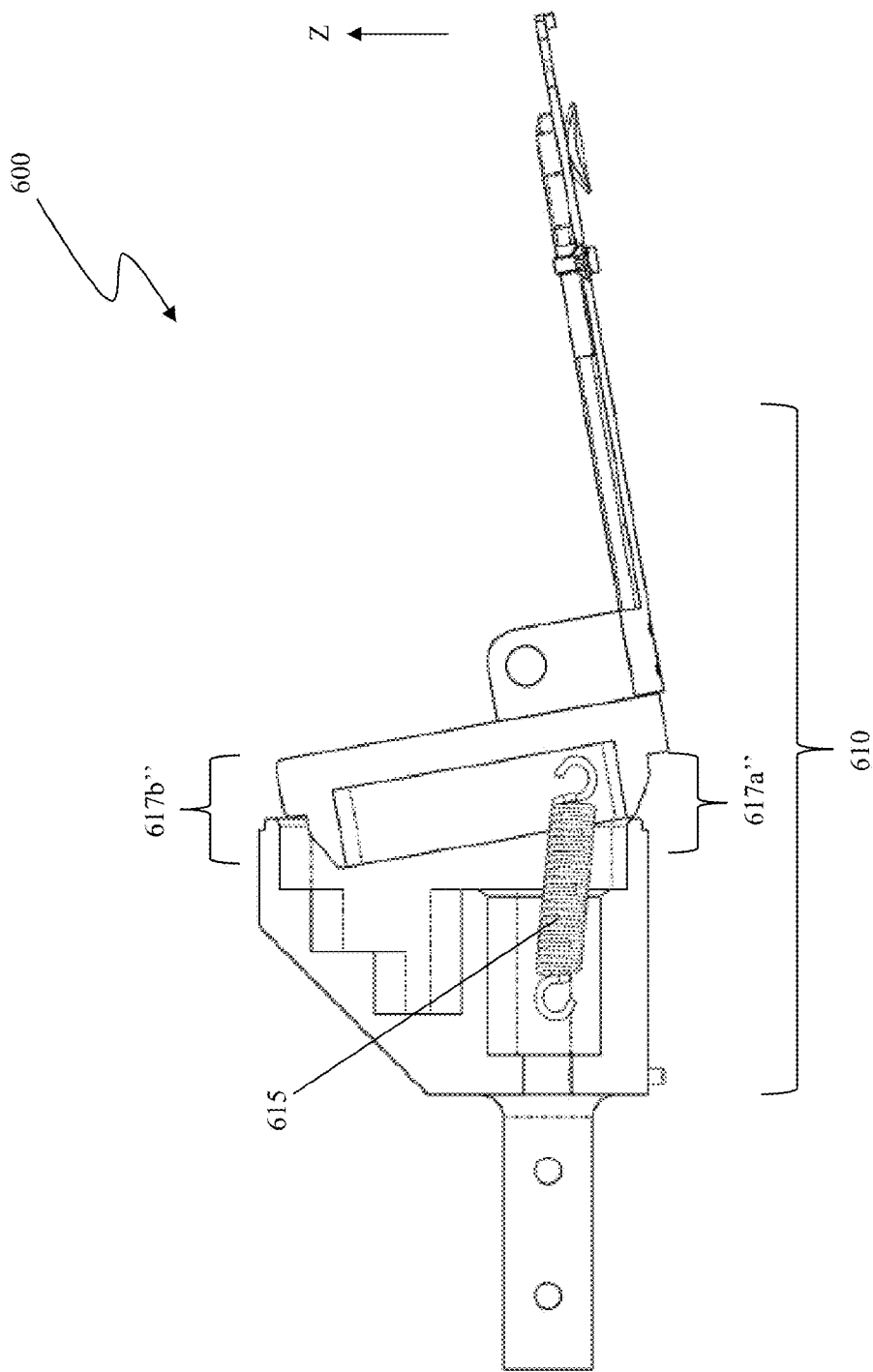
FIG. 15 is a schematic cross-sectional side view illustration of the crash head showing the crash arm with an excessive amount of upward deflection (Z direction) following a big collision according to an embodiment of a system described herein.

FIG. 15 is a schematic cross-sectional side view illustration of the crash head 600 showing the crash arm 610 with an excessive amount of upward deflection (Z direction) following a big collision according to an embodiment of a system described herein. For example, an excessive deflection may be deflection greater than 30° from the normal operating position. Excessive deflected positions 617a'',b'' of the mating surfaces 616a,b, are illustrated. As previously discussed, if necessary, the user could easily restore the crash arm 610; however, due at least in part to the bias angle α of the spring 615, in this position the crash arm 610 may generally be able to appropriately self-correct even when a big collision has occurred that caused the excessive upward deflection.

Figure 16:
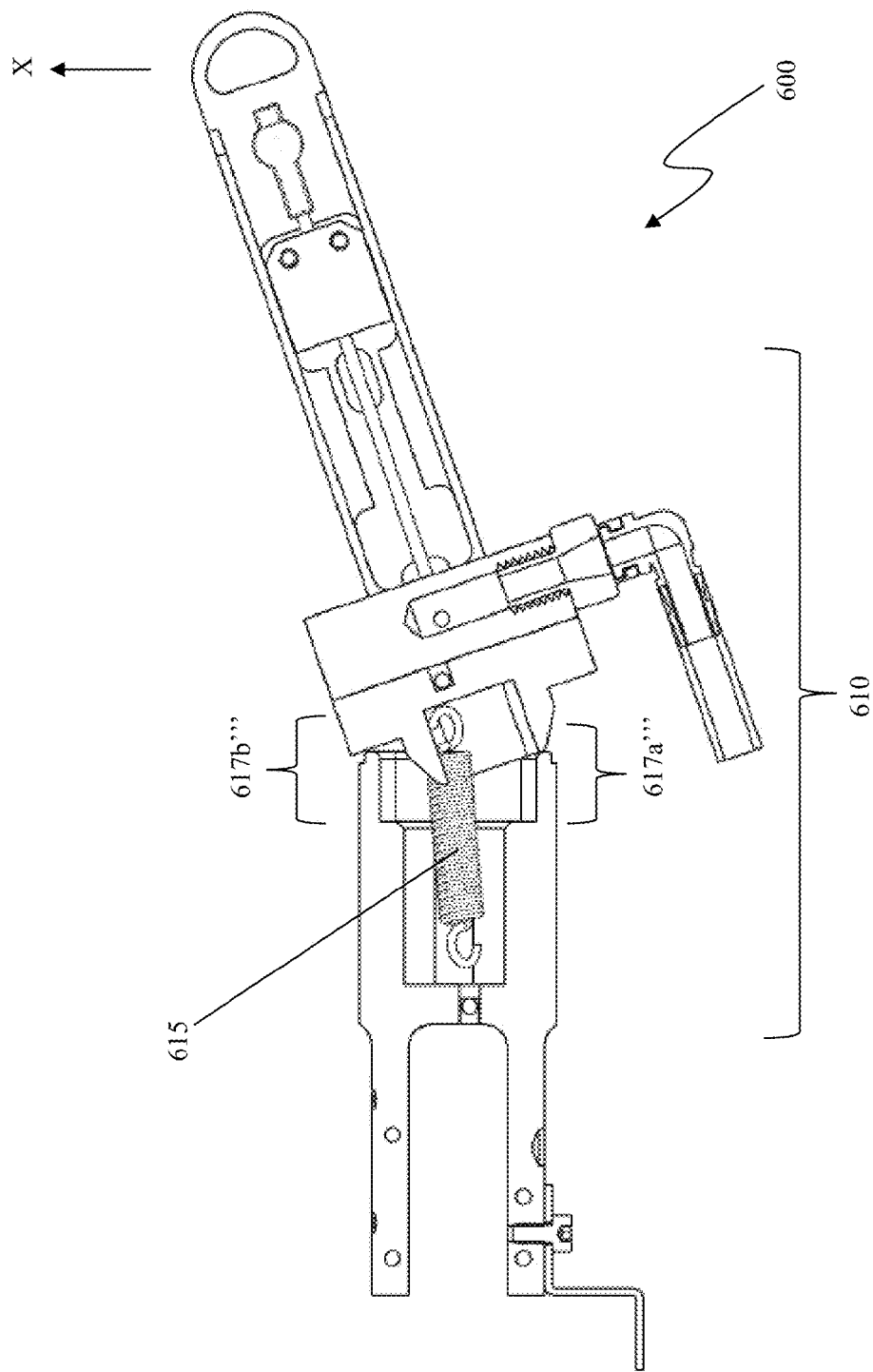
FIG. 16 is a schematic cross-sectional top view illustration of the crash head showing the crash arm with an excessive deflection in the sideway direction (X direction) according to an embodiment of a system described herein.

FIG. 16 is a schematic cross-sectional top view illustration of the crash head 600 showing the crash arm 610 with an excessive deflection in the sideway direction (X direction) according to an embodiment of a system described herein. Excessive deflected positions 617a''',b''' of the mating surfaces 616a,b, are illustrated. As previously discussed, if necessary, the user could easily restore the crash arm 610; however, due, at least in part, to the bias angle β of the spring 615, in this position the crash arm 610 may generally be able self-correct even when a big collision has occurred that caused the excessive sideways deflection.

Figure 17:
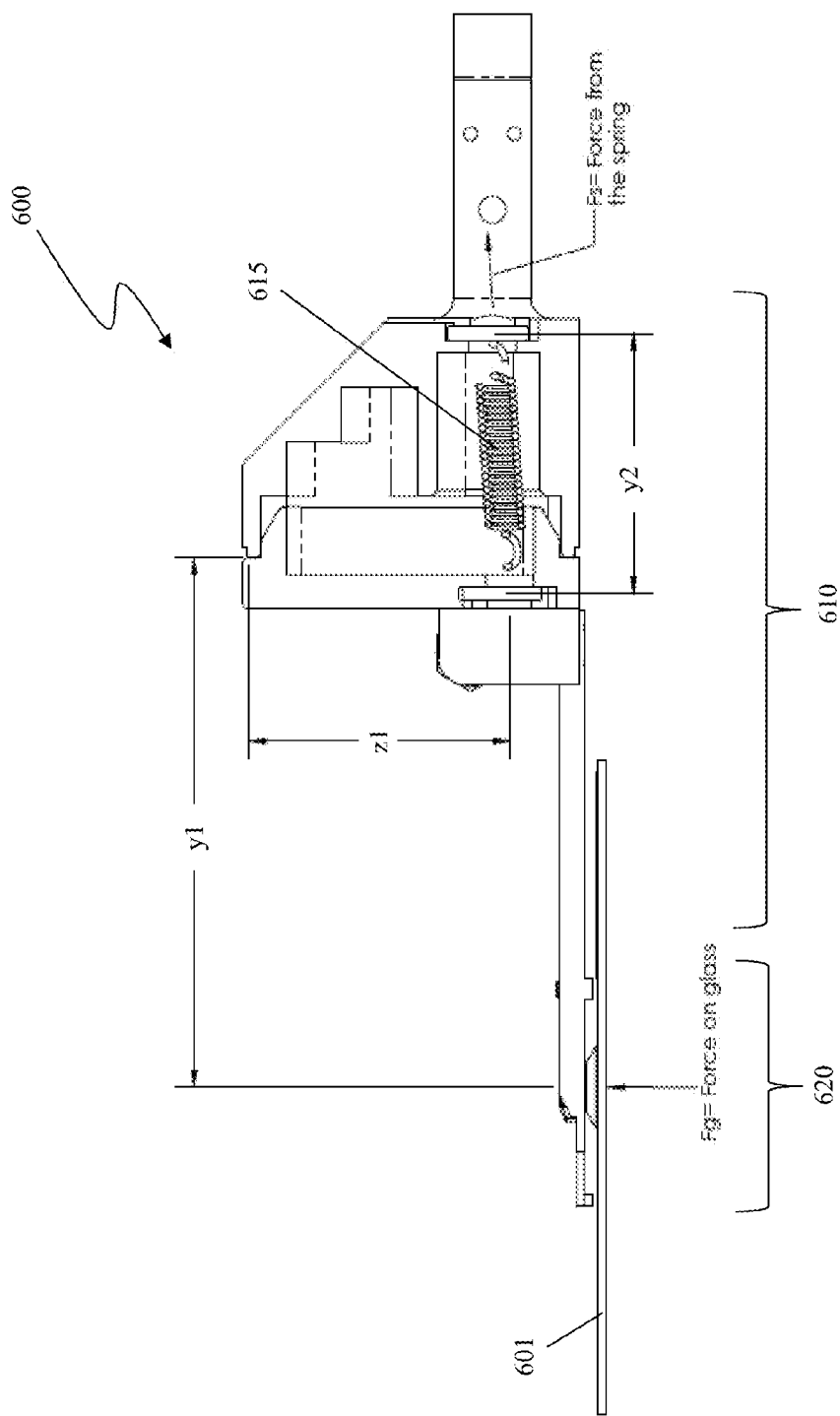
FIG. 17 is a schematic illustration of the crash head presented in connection with illustrated lengths of components of the crash head for a force calculation to determine the spring force that will limit the force imposed on the spring to a desired value according to an embodiment of a system described herein.

FIG. 17 is a schematic illustration of the crash head 600 presented in connection with illustrated lengths (z1, y1, y2) of components of the crash head 600 for a force calculation to determine the spring force that will limit the force imposed on the spring 615 of the crash arm 610 to a desired value (e.g., 2 lbs) according to an embodiment of a system described herein. In connection with force calculations discussed herein, reference is also made to FIGS. 20 and 21 concerning angles α and β discussed in detail elsewhere herein. For a desired force on the glass (Fg) of the slide 601 before spring 615 release begins, the following equations may be used for determining the force from the spring (Fs):

Balance of forces equation: $Fg \cdot y1 = Fs \cdot \cos\alpha \cdot z1$    EQUATION 1

Required force from the spring: $Fs = (Fg \cdot y1)/(z1 \cdot \cos\alpha)$    EQUATION 2

Thus, the spring 615 should provide the force Fs when extended to y2+ a pin diameter. For example, for Fg=2 lbs, α=4°, y1=2.434 in, z1=1.194 in, y2=1.197, and the pin diameter=0.63 in, from Equations 1 and 2, Fs is calculated as 4.09 lbs, meaning that the spring 615 should provide 4.09 lbs when extended to (1.197+0.63)=1.260 in.

Figure 18:
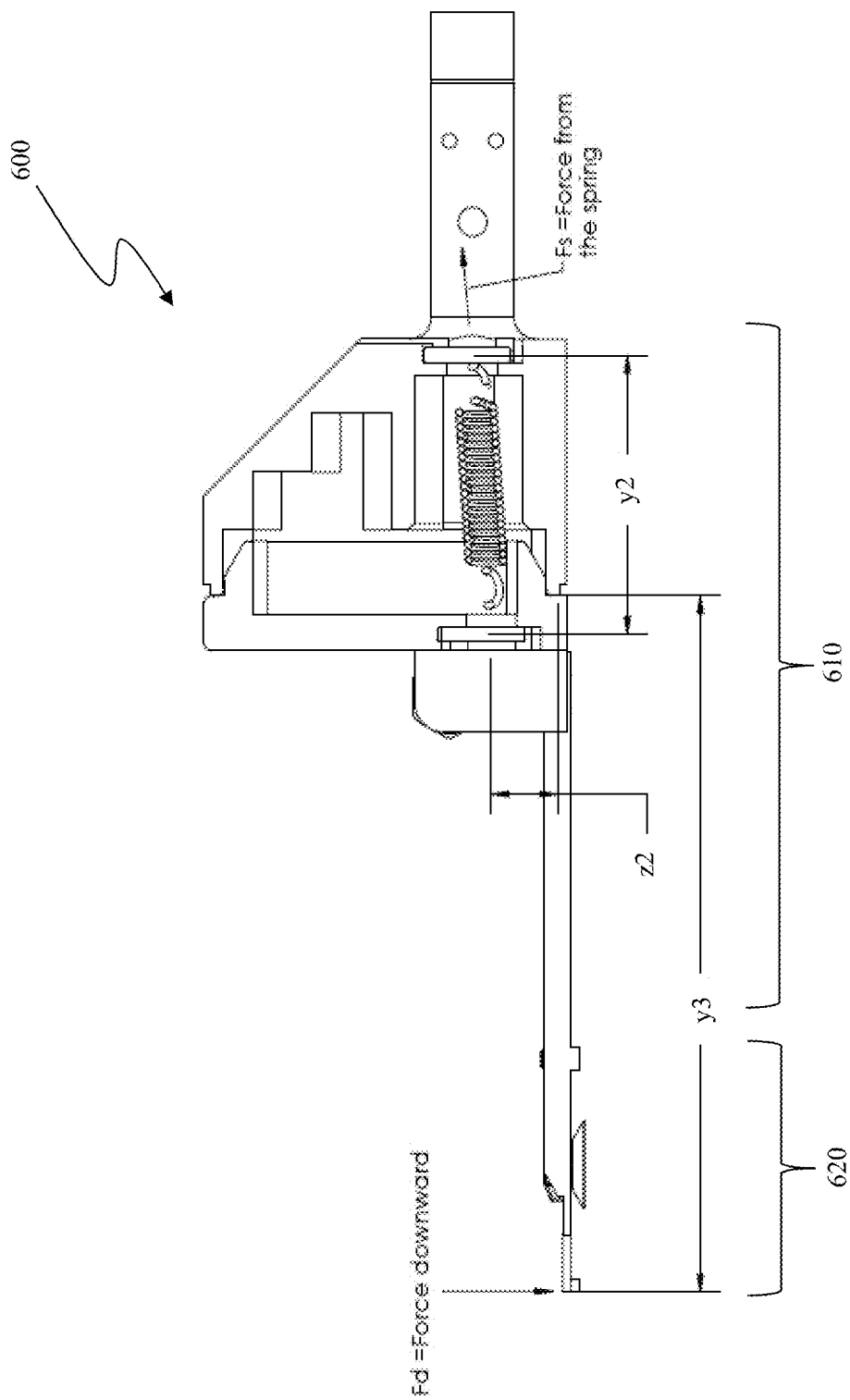
FIG. 18 is a schematic illustration of the crash head presented in connection with illustrated lengths of components of the crash head for a force calculation in connection with determining a downward force to release the crash arm according to an embodiment of a system described herein.

FIG. 18 is a schematic illustration of the crash head 600 presented in connection with illustrated lengths (z2, y2, y3) of components of the crash head 600 for a force calculation in connection with determining a downward force to release the crash arm 610 according to an embodiment of a system described herein. Given the spring force (Fs) determined for the spring 615 in connection with FIG. 17, determining the downward force (Fd) needed to release the crash arm 610 is as follows:

Balance of forces equation: $Fd \cdot y3 = Fs \cdot \cos \alpha \cdot z2$     EQUATION 3

Resulting $Fd$ when spring release begins: $Fd=(Fs \cdot \cos \alpha \cdot z2)/y3$     EQUATION 4

From the example discussed in connection with FIG. 17, and using Equations 3 and 4, for Fs=4.09 lbs, α=4°, z2=0.287 in, y3=2.984 in, and y2=1.197 in, the resulting force downward (Fd) when spring release begins is calculated as 0.39 lbs. According to a system described herein, the chance of damage to the slide 601, crash arm 610 or obstacle is thereby minimized.

Figure 19:
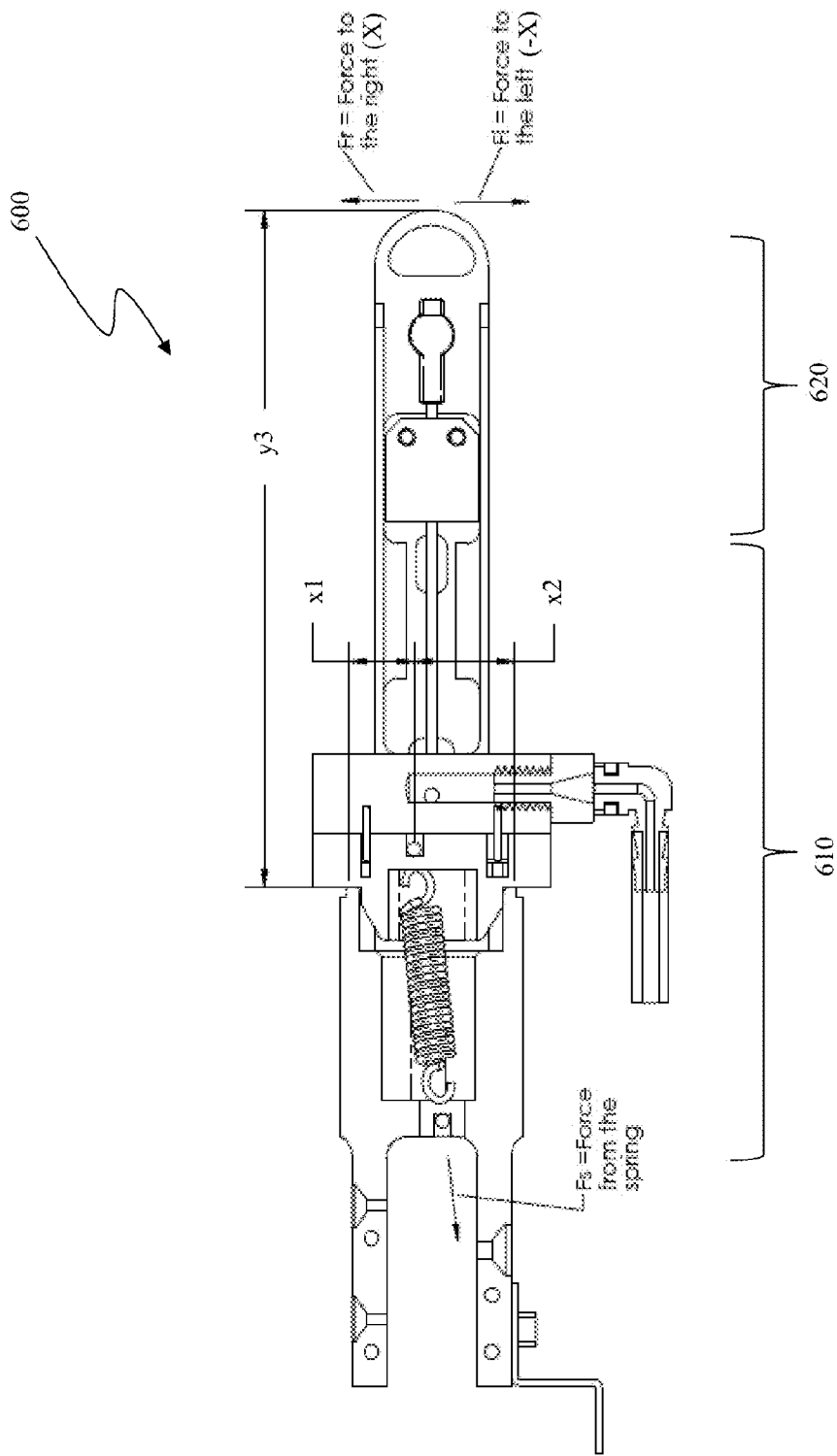
FIG. 19 is a schematic illustration of the crash head presented in connection with illustrated lengths of components of the crash head for a force calculation in connection with determining a sideways force is needed to release the arm in either the left or right directions according to an embodiment of a system described herein.

FIG. 19 is a schematic illustration of the crash head 600 presented in connection with illustrated lengths (x1, x2, y3) of components of the crash head 600 for a force calculation in connection with determining a sideways force is needed to release the crash arm 610 in either the left or right directions (X axis) according to an embodiment of a system described herein. Given the spring force (Fs) for the spring 615 determined in connection with FIG. 17, determining the sideways (right, left) forces (Fr, Fl) needed to release the crash arm 610 is as follows:

Balance of forces during deflection to the right:
$Fr \cdot y3 = Fs \cdot \cos \beta \cdot x1$     EQUATION 5

Resulting $Fr$ when spring release begins: $Fr=(Fs \cdot \cos \beta \cdot x1)/y3$     EQUATION 6

Balance of forces during deflection to the left:
$Fl \cdot y3 = Fs \cdot \cos \beta \cdot x2$     EQUATION 7

Resulting $FL$ when spring release begins: $Fl=(Fs \cdot \cos \beta \cdot x2)/y3$     EQUATION 8

From the example discussed in connection with FIG. 17, and using Equations 5-8, for Fs=4.09 lbs, β=6°, x1=0.287 in, x2=0.443 in, y3=2.984 in, the resulting forces sideways when spring release begins are calculated as Fr=0.39 lbs and Fl=0.60 lbs. According to a system described herein, the chance of damage to the crash arm 610 or obstacle is thereby minimized.

Figure 20:
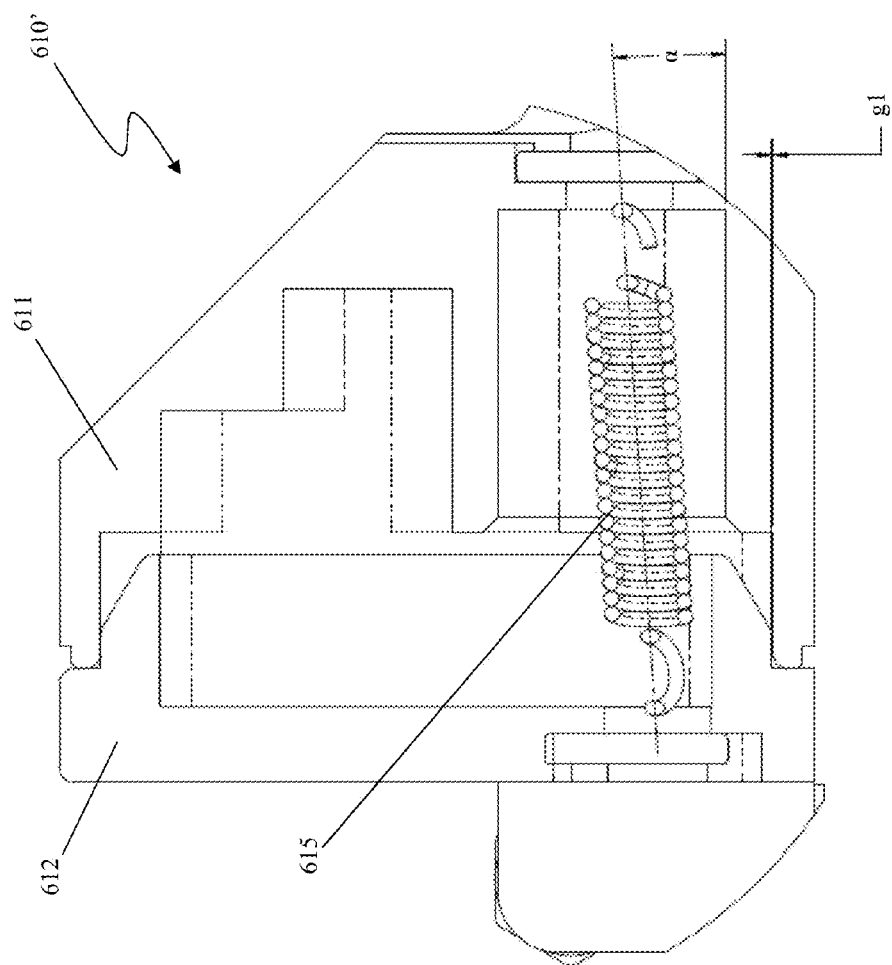
FIG. 20 is a schematic illustration showing an enlarged (reverse) cross-sectional side view of the crash arm according to an embodiment of a system described herein.

FIG. 20 is a schematic illustration showing an enlarged (reverse) cross-sectional side view 610' of the crash arm 610 according to an embodiment of a system described herein. As further discussed elsewhere herein, the spring 615 is biased at the angle α to encourage the two mating parts 611, 612 to mate at a horizontal reference surface (e.g. with respect to normal operating position) of the crash arm 610. If a disturbance creates a gap (g1) at the horizontal reference surface, the resulting offset of the alignment of the crash arm 610 is limited to the gap distance g1, which may be a very small distance, for example 0.004 in. Additionally, the action of the crash arm 610 when it presses down on the slide will push the mating parts 611, 612 back into alignment. In an embodiment, the angle α of the spring 615 may be 4 degrees in an embodiment, but any similarly appropriate angle may serve the same purpose.

Figure 21:
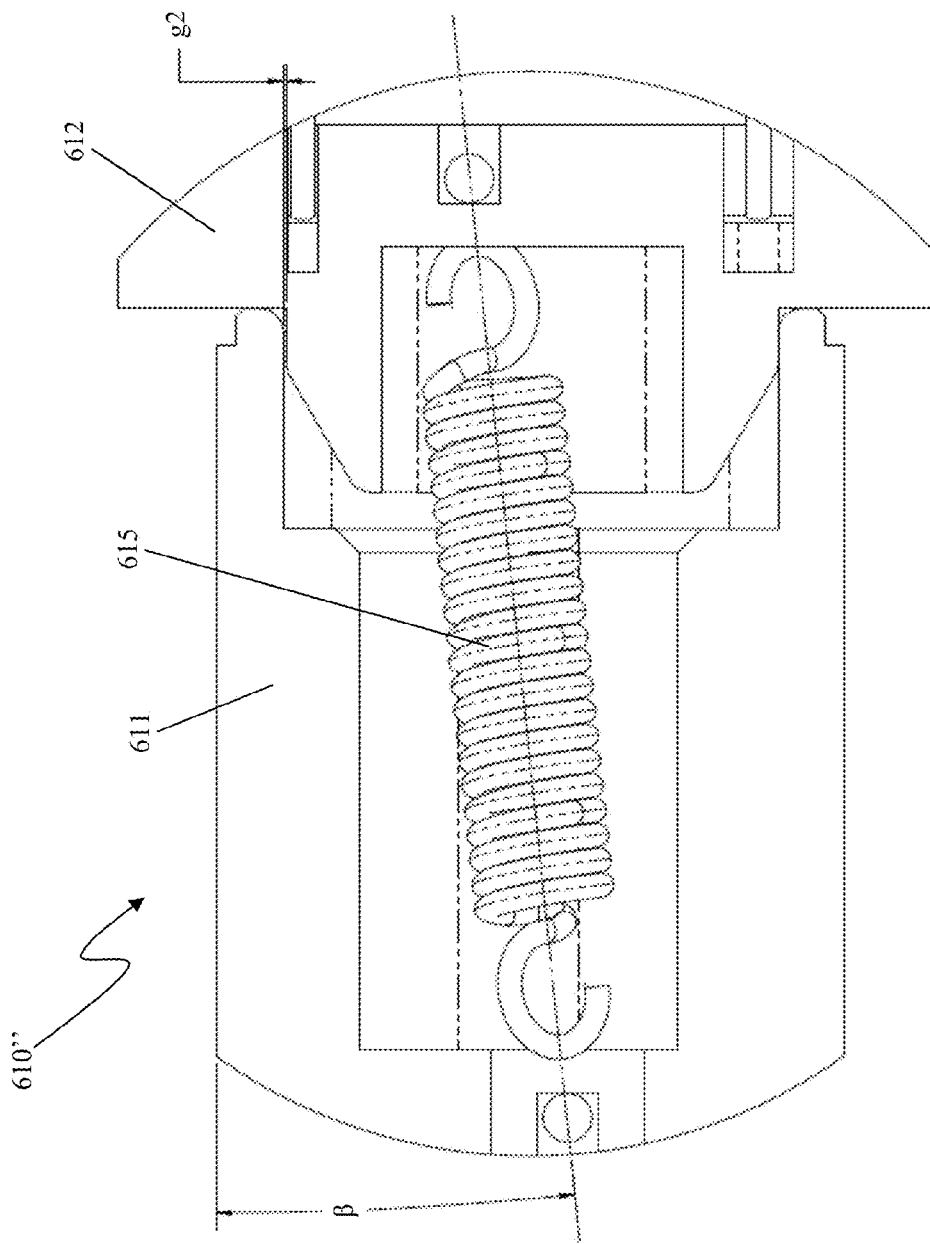
FIG. 21 is a schematic illustration showing an enlarged cross-sectional top view of the crash arm according to an embodiment of a system described herein.

FIG. 21 is a schematic illustration showing an enlarged cross-sectional top view 610'' of the crash arm 610 according to an embodiment of a system described herein. As further discussed elsewhere herein, the spring 615 is biased at the angle β to encourage the two mating parts 611, 612 to mate at a vertical reference surface (e.g. with respect to normal operating position) of the crash arm 610. If a disturbance creates a gap (g2) at the vertical reference surface, the resulting offset of the alignment of the crash arm 610 is limited to the gap distance g2, which may be a very small distance, for example 0.004 in. Additionally the action of the crash arm 610 when it pushes sideways on the slide has the effect of moving the mating parts 611, 612 back into alignment. In an embodiment, the angle β of the spring may be 6 degrees in an embodiment, but any similarly appropriate angle may serve the same purpose.

Figure 22:
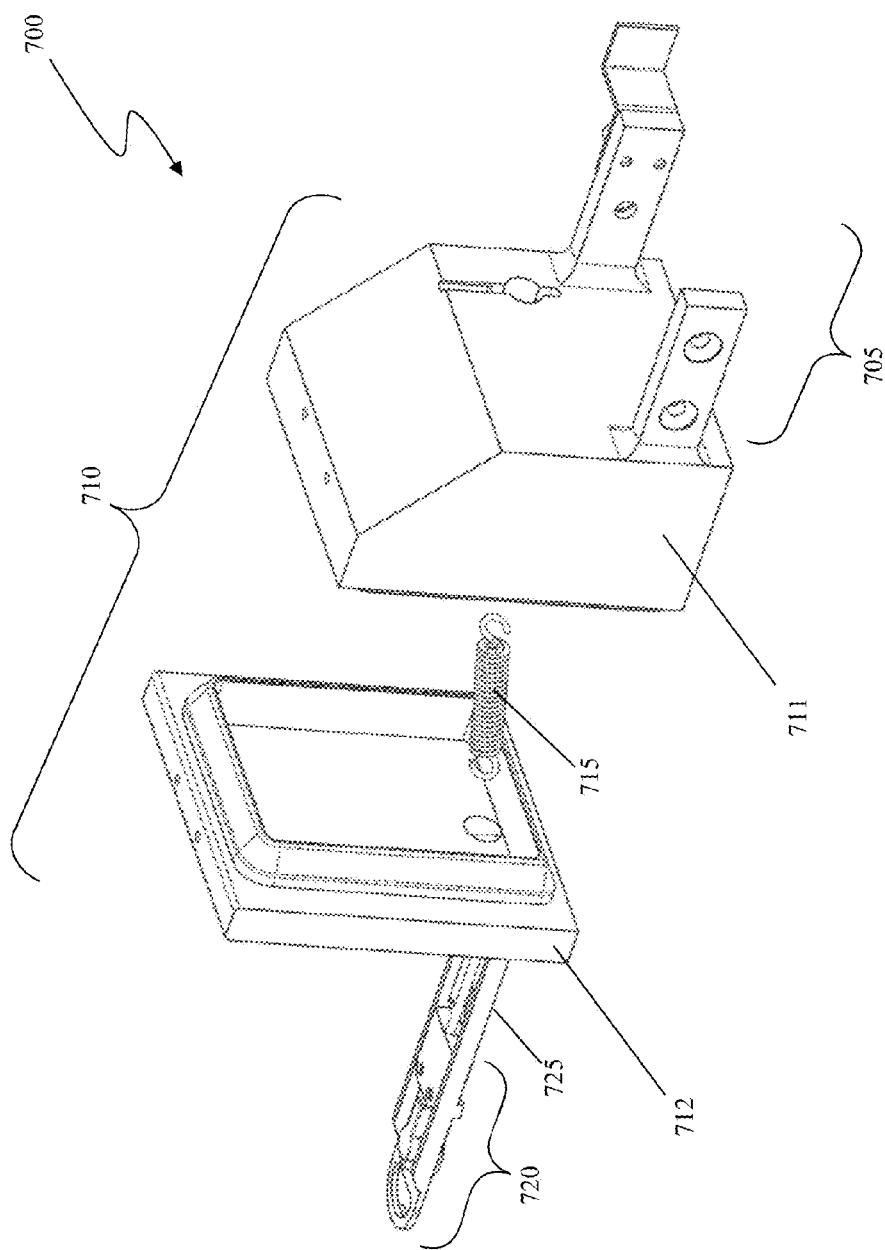
FIGS. 22 and 23 are schematic illustrations showing another embodiment of a system described herein having modified configurations and features to provide a crash head that is reliably self-correcting even after large collisions that may cause excessive deflections from the normal operating position.
Figure 23:
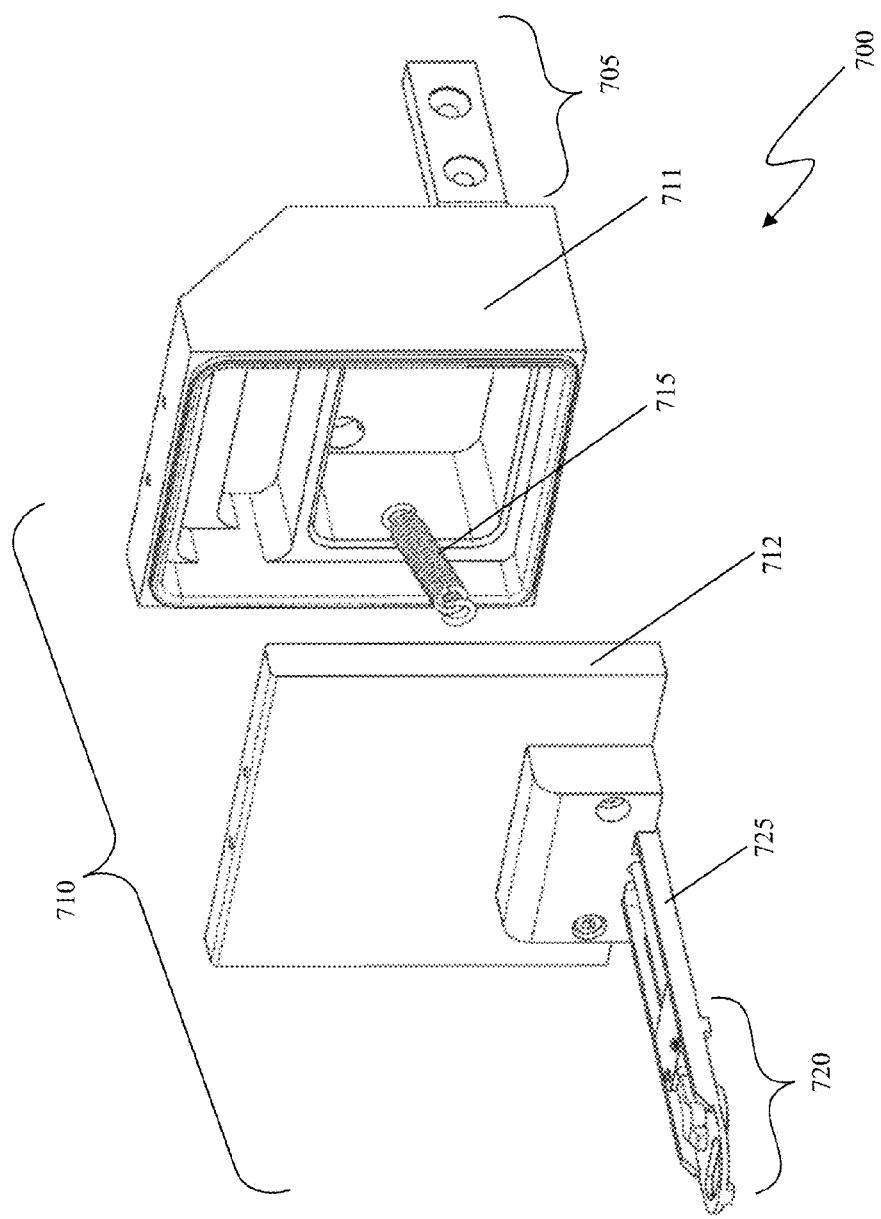

FIGS. 22 and 23 are schematic illustrations showing another embodiment of a system described herein having modified configurations and features to provide a crash head 700 that is reliably self-correcting even after large collisions that may cause excessive deflections from the normal operating position, for example, deflections greater than 30°. Similar to the crash head 600 discussed elsewhere herein, the crash head 700 may include a crash arm 710, a pickup head 720 for picking up a slide, and an attachment mechanism 705 for attachment of the crash head 700 to a moveable base and/or other movement mechanism of a slide handler (see, e.g., FIGS. 5 and 6). This alternate embodiment may involve use of a larger structure of the crash arm 710, in which a spring 715 may be positioned at a larger angle in one or more bias directions, larger than that discussed elsewhere herein, for example, larger than 10 degrees. A larger angle creates a greater force to pull the mating parts 711, 712 into the normal operating position. This larger angle will create more force in the X and Z directions, making this embodiment of the crash head 700 more reliably self-correcting in response to unusually large collisions. As noted, though, the larger angle may require a larger structure of the crash head 700 that may be more expensive and may, in some cases, undesirably impact other operations of an imaging system. Thereby, the selection of the angle involves a trade-off assessment between use of the larger angle for the spring 715 and larger structural parts with the assessed need to be reliably self-correcting for increasing larger (and increasingly rare) collisions.

Figure 24:
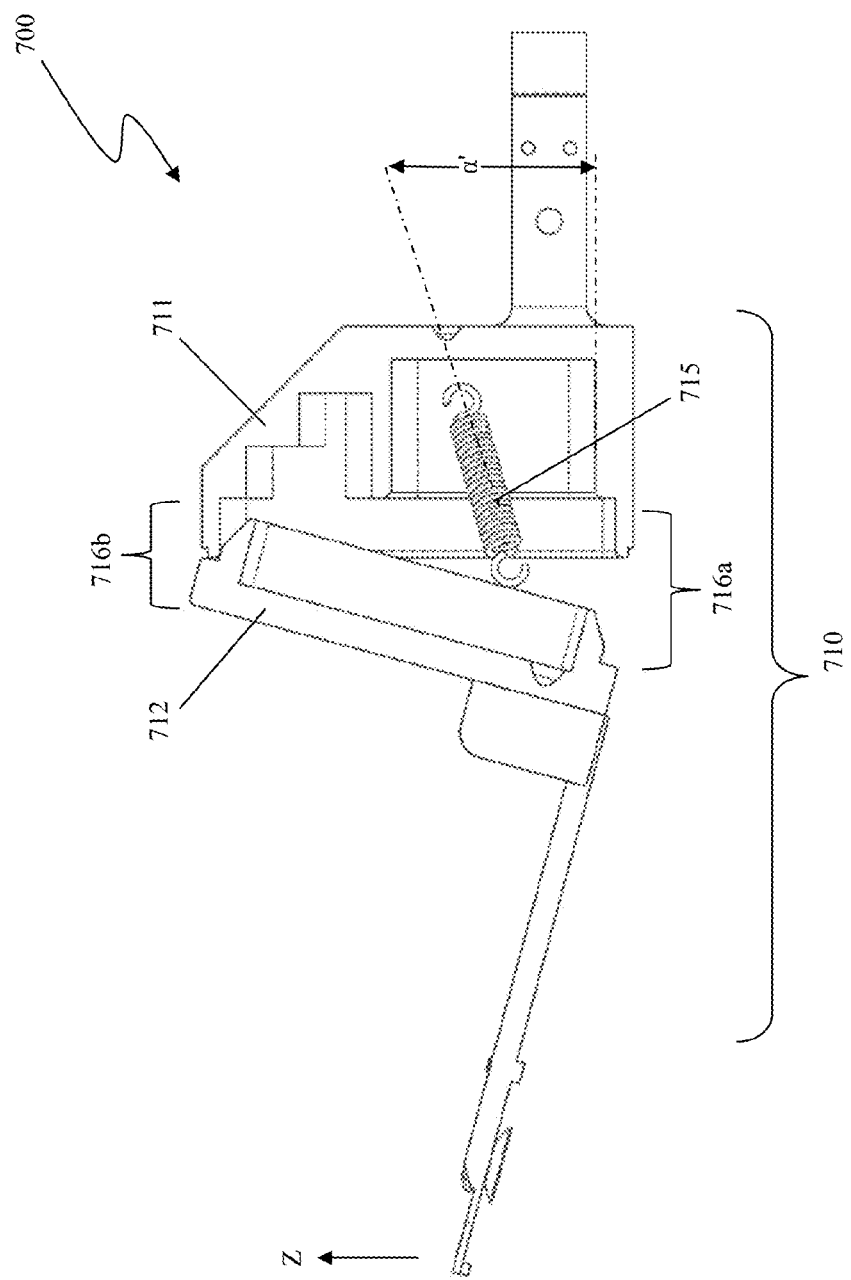
FIG. 24 is a schematic cross-sectional side view illustration of the crash head including a spring disposed at a large angle to reliably self-correct the crash arm having an excessive amount of upward deflection (Z direction) following a large collision according to an embodiment of a system described herein.

FIG. 24 is a schematic cross-sectional side view illustration of the crash head 700 showing the spring 715 disposed at a larger angle α' to reliably self-correct the crash arm 710 having an excessive amount of upward deflection (Z direction) following a large collision according to an embodiment of a system described herein. As discussed, the spring 715 may be disposed at the larger angle α' that creates more force in the X and Z directions. For example, in an embodiment, the angle α' of the spring 715 may be 30 degrees, and the spring 715 housed inside of mating parts 71, 712 that are physically bigger to allow for this greater angle. Further, mating surfaces 716a,b of the mating parts 711, 712 may be configured for larger mating parts 711, 712 and to facilitate the action of the spring 715 to bring the mating parts 711, 712 back into proper mating at the normal operating position following the excessive deflection of the crash arm 710. In various embodiments, the spring 715 may be positioned at an angle that is in a range greater than 0° and less than or equal to 45°, and particularly, between 10° and 30°. In various embodiments, the spring 715 may be a coiled extension spring, but other designs may make use of power springs, clock springs and/or plastic springs molded into the body of one of the mating parts 711, 712 (e.g., using a molded part design). It is noted that a similarly large angle as that of angle α' may be used in connection with a bias of the spring 715 in the X direction (compare with angle β, as discussed elsewhere herein). It is also noted that in various embodiments a system described herein may be suitably used and configured in connection with the use of multiple springs that may be respectively biased in the different directions that are discussed herein.

Various embodiments discussed herein may be combined with each other in appropriate combinations in connection with a system described herein. Additionally, in some instances, the order of steps in the flowcharts, flow diagrams and/or described flow processing may be modified, where appropriate. Further, various aspects of a system described herein may be implemented using software, hardware, a combination of software and hardware and/or other computer-implemented modules or devices having the described features and performing the described functions. Software implementations of aspects of a system described herein may include executable code that is stored in a computer readable medium and executed by one or more processors. The computer readable medium may include volatile memory and/or non-volatile memory, and may include, for example, a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. A system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A slide handling device, comprising:
   a crash arm assembly including:
      a first mating part;
      a second mating part;
      an extension arm used in connection with picking up a slide and being coupled to the second mating part; and
      a spring coupling the first mating part and the second mating part, wherein the spring is biased by at least one angle in at least one direction, wherein the at least one angle facilitates mating of the first mating part and the second mating part in a normal operating position of the crash arm assembly, and wherein, upon deflection of the crash arm assembly from the normal operating position, the spring applies a force to return the crash arm assembly to the normal operating position.

2. The slide handling device according to claim 1, wherein the spring is biased by the at least one angle in a direction out of a horizontal plane of the normal operating position of the crash arm assembly.

3. The slide handling device according to claim 2, wherein the at least one angle is greater than 0 degrees and less than or equal to 10 degrees from the horizontal plane of the normal operating position.

4. The slide handling device according to claim 1, wherein the spring is biased by at least two angles in at least two directions.

5. The slide handling device according to claim 4, wherein a first angle of the at least two angles biases the spring in a direction out of a horizontal plane of the normal operating position of the crash arm assembly, and wherein a second angle of the at least two angles biases the spring in a direction within the horizontal plane of the normal operation position of the crash arm assembly.

6. The slide handling device according to claim 1, wherein the first mating part includes a first mating surface, and the second mating part includes a second mating surface, wherein geometries of the first mating surface and the second mating surface facilitate mating of the first mating part and the second mating part.

7. The slide handling device according to claim 1, wherein, as a result of a position of the spring, a first force of the spring to return the crash arm assembly to the normal operating position following a deflection in a first direction is different from a second force of the spring to return the crash arm assembly to the normal operating position following a deflection in a second direction.

8. The slide handling device according to claim 1, wherein, as a result of a position of the spring, a maximum first force applied to the crash arm assembly, before deflection of the crash arm assembly occurs, in a first direction used to pick up a slide is greater than a maximum second force applied to the crash assembly, before deflection of the crash arm assembly occurs, in a second direction different from the first direction.

9. The slide handling device according to claim 1, further comprising:
   a pickup head assembly coupled to the extension arm that picks up a slide.

10. The slide handling device according to claim 1, further comprising:
    at least one assembly that detects the deflection of the extension arm.

11. An imaging system, comprising:
    an imaging device for imaging a sample on at least one slide;
    a slide rack that stores the at least one slide;
    a slide handling device that moves the at least one slide from the slide rack to the imaging device, the slide handling device including:
       a crash arm assembly including:
          a first mating part;
          a second mating part;
          an extension arm used in connection with picking up a slide and being coupled to the second mating part; and
          a spring coupling the first mating part and the second mating part, wherein the spring is biased by at least one angle in at least one direction, wherein the at least one angle facilitates mating of the first mating part and the second mating part in a normal operating position of the crash arm assembly, and wherein, upon deflection of the crash arm assembly from the normal operating position, the spring applies a force to return the crash arm assembly to the normal operating position.

12. The imaging system according to claim 11, wherein the spring is biased by the at least one angle in a direction out of a horizontal plane of the normal operating position of the crash arm assembly.

13. The imaging system according to claim 12, wherein the at least one angle is greater than 0 degrees and less than or equal to 10 degrees from the horizontal plane of the normal operating position.

14. The imaging system according to claim 11, wherein the spring is biased by at least two angles in at least two directions.

15. The imaging system according to claim 14, wherein a first angle of the at least two angles biases the spring in a direction out of a horizontal plane of the normal operating position of the crash arm assembly, and wherein a second angle of the at least two angles biases the spring in a direction parallel to the horizontal plane of the normal operation position of the crash arm assembly.

16. The imaging system according to claim 11, wherein the first mating part includes a first mating surface, and the second mating part includes a second mating surface, wherein geometries of the first mating surface and the second mating surface facilitate mating of the first mating part and the second mating part.

17. The imaging system according to claim 11, wherein, as a result of a position of the spring, a first force of the spring to return the crash arm assembly to the normal operating position following a deflection in a first direction is different from a second force of the spring to return the crash arm assembly to the normal operating position following a deflection in a second direction.

18. The imaging system according to claim 11, wherein, as a result of a position of the spring, a maximum first force applied to the crash arm assembly, before deflection of the crash arm assembly occurs, in a first direction used to pick up a slide is greater than a maximum second force applied to the crash assembly, before deflection of the crash arm assembly occurs, in a second direction different from the first direction.

19. The imaging system according to claim 11, further comprising:
   a pickup head assembly coupled to the extension arm that picks up a slide.

20. The imaging system according to claim 11, further comprising:
   at least one assembly that detects the deflection of the extension arm.

* * * * *